US008155959B2

(12) United States Patent
Weng et al.

(10) Patent No.: US 8,155,959 B2
(45) Date of Patent: Apr. 10, 2012

(54) DIALOG SYSTEM FOR HUMAN AGENT TO CORRECT ABNORMAL OUTPUT

(75) Inventors: Fuliang Weng, Mountain View, CA (US); Baoshi Yan, Sunnyvale, CA (US); Zhe Feng, Xian (CN)

(73) Assignee: Robert Bosch GmbH, Stuttgart (DE)

( * ) Notice: Subject to any disclaimer, the term of this patent is extended or adjusted under 35 U.S.C. 154(b) by 870 days.

(21) Appl. No.: 11/936,658

(22) Filed: Nov. 7, 2007

(65) Prior Publication Data

US 2009/0119104 A1 May 7, 2009

(51) Int. Cl.
*G10L 15/22* (2006.01)
*H04M 1/64* (2006.01)
*H04M 3/51* (2006.01)

(52) U.S. Cl. ..................... 704/236; 704/275; 379/88.01; 379/267

(58) Field of Classification Search .................. 704/236, 704/240, 270, 270.1, 275; 379/100.5, 261, 379/88.01, 267
See application file for complete search history.

(56) References Cited

U.S. PATENT DOCUMENTS 5,745,877 A * 4/1998 Nijmam et al. ............... 704/270
6,173,266 B1 * 1/2001 Marx et al. .................... 704/270
7,143,042 B1 * 11/2006 Sinai et al. ................. 704/270.1
7,529,667 B1 * 5/2009 Gorin et al. ................... 704/240
7,720,684 B2 * 5/2010 Huerta et al. ................. 704/257
7,916,852 B2 * 3/2011 Bruce et al. .............. 379/218.02
8,001,469 B2 * 8/2011 Weng et al. ................... 715/708
2001/0047261 A1 * 11/2001 Kassan ......................... 704/270
2003/0144841 A1 7/2003 Shao
2003/0191625 A1 * 10/2003 Gorin et al. ....................... 704/1
2003/0215066 A1 * 11/2003 Shambaugh et al. ...... 379/88.13
2005/0080628 A1 * 4/2005 Kuperstein ................. 704/270.1
2005/0286707 A1 * 12/2005 Erhart et al. ............. 379/265.07
2006/0074670 A1 * 4/2006 Weng et al. ................... 704/257
2006/0149555 A1 * 7/2006 Fabbrizio et al. ............. 704/275
2006/0230410 A1 * 10/2006 Kurganov et al. ............ 719/311
2006/0233326 A1 * 10/2006 Erhart et al. ............... 379/88.16
2009/0119586 A1 * 5/2009 Weng et al. ................... 715/705
2009/0306995 A1 * 12/2009 Weng et al. ........................ 705/1
2010/0124325 A1 * 5/2010 Weng et al. .............. 379/265.11

OTHER PUBLICATIONS

First Office Action dated Sep. 29, 2010 for U.S. Appl. No. 11/936,644 (pp. 1-9).

* cited by examiner

*Primary Examiner* — Martin Lerner
(74) *Attorney, Agent, or Firm* — Dergosits & Noah LLP; Geoffrey T. Staniford

(57) ABSTRACT

Systems and methods are described that automatically control modules of dialog systems. The systems and methods include a dialog module that receives and processes utterances from a speaker and outputs data used to generate synthetic speech outputs as responses to the utterances. A controller is coupled to the dialog module, and the controller detects an abnormal output of the dialog module when the dialog module is processing in an automatic mode. The controller comprises a mode control for an agent to control the dialog module by correcting the abnormal output and transferring a corrected output to a downstream dialog module that follows, in a processing path, the dialog module. The corrected output is used in further processing the utterances.

21 Claims, 12 Drawing Sheets

400

DIALOG SYSTEM FOR HUMAN AGENT TO CORRECT ABNORMAL OUTPUT

TECHNICAL FIELD

The disclosure herein relates generally to dialog systems and, more particularly, to automatically generating interactive systems configured for controlling dialog events and collecting dialog data of human-machine interactions in dialog systems.

BACKGROUND

Spoken-dialog or natural language interaction systems for applications such as customer care increasingly use statistical language models and statistically-based semantic processing for recognition and analysis of utterances. The design and deployment of these dialog systems involves significant data collection in order to provide a corpus that is representative of the intended service and sufficiently large for development, training and evaluation. Consequently, the development of these natural language spoken dialogue systems requires a large database of annotated speech utterances that adequately represent the way humans interact with the system. The speech utterances collected for use in training dialog systems should not be collected via human-human interactions, as research has shown that human-human interactions are very different from human-machine interactions in terms of language characteristics and linguistic behavior.

A methodology referred to as the Wizard-of-Oz (WOZ) methodology has been used extensively as a method of collecting high-quality, machine-directed speech data for use in training dialog systems. The WOZ approach uses a hidden human agent or customer service representative to simulate the behavior of the dialog system so that the callers believe they are interacting with a dialog system. Best practices dictate, however, that thousands or tens of thousands of utterances need to be collected and transcribed in order to achieve a decent coverage in speech recognition and spoken language understanding in natural language dialog systems. Moreover, the WOZ approach does not scale in terms of cost and time needed to complete collection of the necessary data. Other concerns with the WOZ approach include its lack of realism because, in WOZ simulations, both the subjects and the wizard(s) are playing roles. The wizard, who is played by the researcher interested in collecting "natural" user utterances, is playing the role of a dialog system. The subjects, because they are taking part in a scientific experiment, are playing the role of real users performing real tasks in a real world setting.

Conventional data collection systems referred to as "ghost wizard" systems have also been proposed for collecting corpus data. A typical ghost wizard system plays an open prompt to callers, receives one caller utterance, plays another prompt to the caller saying the system did not understand the received utterance, receives yet another caller utterance, and then transfers the call to a human operator. The ghost wizard systems thus achieve data collection at the cost of negative caller experiences, as the callers are forced to repeat their requests. In addition, ghost wizard systems cannot be used in collecting follow-up dialogs, as they can only be used at the beginning of a conversation.

Another conventional WOZ approach involves a data collection system for call-routing applications deployed in an actual dialog system environment. This conventional system is configured to allow a customer service representative to work on or use a WOZ interface to produce machine-generated voice responses to the callers, giving users an impression of human-machine interaction, while routing the calls correctly, thus achieving real-world data collection without compromising user experiences. However, this conventional system is domain specific and tightly tied to the call-routing domain.

In contrast to the conventional systems, there is a need for a generic framework and automated approach for generating in-service data collection interfaces for operator-involved partially or even fully automated dialog systems, which can be applied to any domain using natural language dialog systems without interrupting the ongoing natural workflow between real callers and operators. In addition, there is a need for an interactive system that automatically logs all data between callers and operators (e.g., wizards) in real-time during the human-machine interaction and automatically annotates such data at various dialog module levels.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1A:
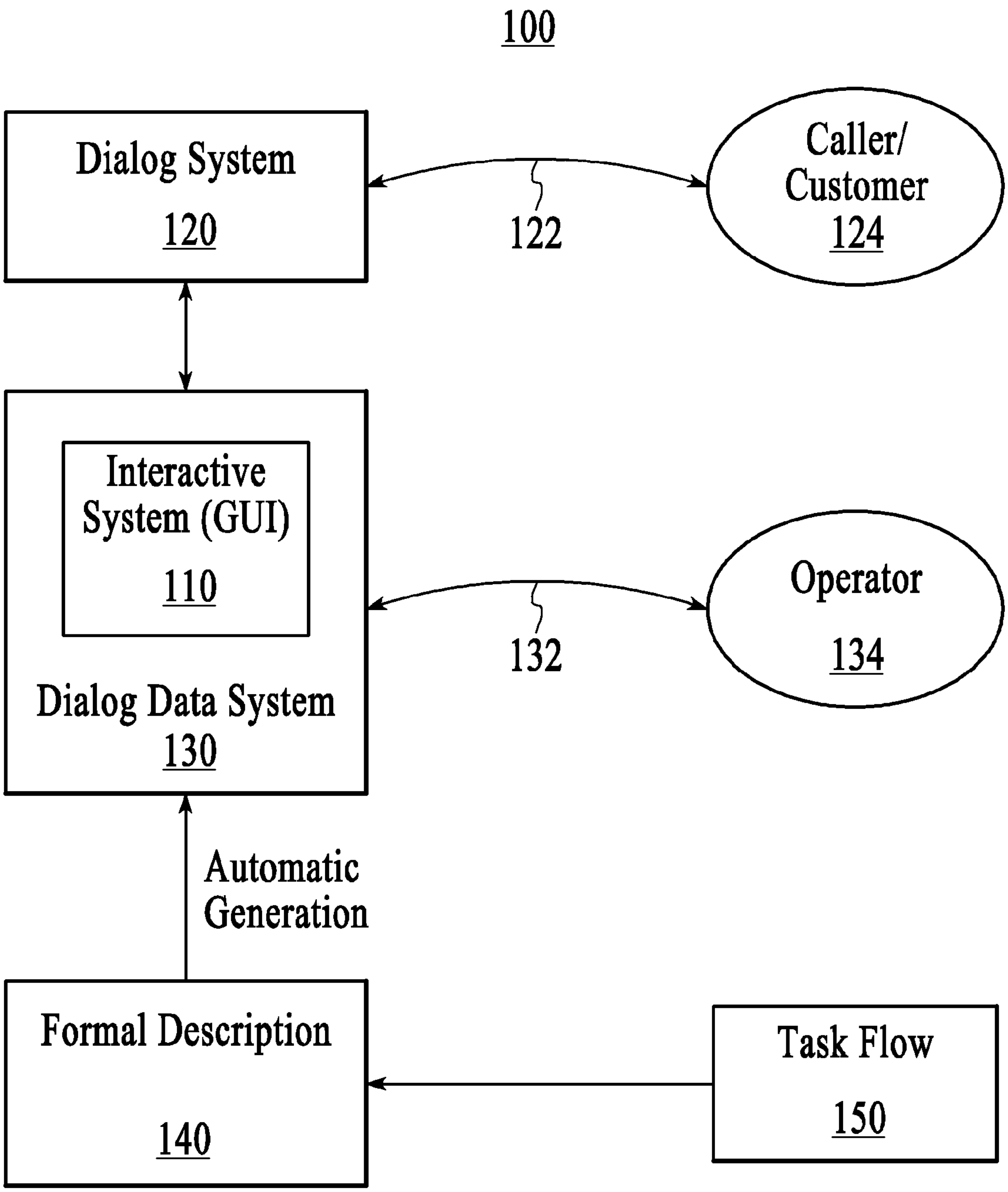
FIG. 1A shows a dialog system environment that includes the interactive system, under an embodiment.

The systems and methods described herein automatically generate interactive systems from a formalized description language. The interactive systems, once generated, are used by customer service representatives or human operators to control human-machine interactions between humans and a host dialog system, as well as to produce dialog data of the human-machine interactions. The interactive systems of an embodiment enable dialog data to be generated and annotated or labeled in real-time as the human-machine interactions are occurring. The generated interactive systems thus allow human operators to control human-machine interactions through operations that include choosing an option from a list of items, or input information in slots, specified in a script using the formalized description language. The generated interactive systems further allow human operators to control dialog data collection by logging operator selections and data received from callers and time-stamping and translating the selections and data into annotations or labels for the logged data between the operators and callers.

The generated interactive systems may have different levels of automation and wizard involvement, depending on the intent of the dialog system developers. If a module in the dialog system is mature enough and provides high quality results, the system developers may specify it in the automated portion of the generated dialog system. In contrast, if a module needs to be further enhanced, the system developers may assign it as part of wizard's operation. This can also be performed dynamically on-the-fly if the operator notices an unusual case and intervenes in the conversation using the "puppy" module without jumping in as a person. A "puppy" module is a module in the generated interaction system that the operator directly controls to interact with callers, in contrast with the modules from an automated spoken dialog system. The collection and targeted annotation of dialog data using the automatically generated interactive system of an embodiment enables dialog system developers and operators to efficiently collect dialog data for use in developing dialog systems and dialog system applications.

The interactive systems of an embodiment include a graphical user interface (GUI). The GUI is used by an operator to collect data for use in training the dialog system. As an example, the GUI is used by a human operator under a Wizard-of-OZ (WOZ) data collection methodology, but the embodiment is not so limited. The GUI of an embodiment is configured as an interface for controlling the receipt of information from callers and generation by the dialog system of synthesized speech prompts to callers and, in so doing, includes templates that include or provide prompts for guiding an operator through numerous tasks. The operations and/or choices available to the interactive system operator, and provided via the GUI, are specified in the script, and hence are context-dependent. The GUI also may include a graphical depiction of relationships among tasks of the task flow. The GUI is also configured as an interface to a data infrastructure (e.g., application-specific data access infrastructure) of the interactive system. The GUI is described in detail below.

The interactive systems of an embodiment also include a selected subset of modules in a dialog system, such as a language generation module and/or a text-to-speech module, for example. They may also include other modules in a typical dialog system. The input to these modules may be either from a human operator or from another automated module of the system, and the module interfaces are defined using the formalized language. The module interface is the same as the one in a dialog system and the ones that are interfacing with the operator. Which dialog system modules are included in the generated interaction system can be specified either in a configuration file or dynamically on-the-fly based on certain confidence measures. In other words, the fully automated module in a dialog system and the human substitution module are exchangeable.

To an extreme, all automated modules in a dialog system can be configured as a single cluster, and a switch between the automated portion and the agent can be provided in the very same way as what is described above.

The interactive systems of an embodiment are automatically generated from a description or work flow of the desired process. The process task or work flow is described using a formalized description language. The formalized description language includes a formal description or description of numerous parameters of the task flow including, but not limited to, a set of tasks, a starting task, the relationship between the tasks, procedures or processes to be triggered as the interactive system steps through different tasks, and memory allocations necessary to maintain state of the interactive system. Tasks are also further described in the formal description by specifying conditions that are to be satisfied before tasks can be entered, conditions that need to be satisfied before tasks can be completed, annotations and descriptions of the task for human as opposed to computer consumption, whether the task is undoable, inputs associated with the task, vocalized speech patterns associated with the task, and the display of state associated with the task. Other constructs, such as variables, assignments, conditional loops, and other parameters appropriate to the work flow or task flow are included in the formal description but the formal description is not so limited.

The formalized description language of an embodiment is mostly declarative. A declarative description language is a language that describes something in a way that does not require modeling the changes in states to the core process. The declarative description language is in contrast to a procedural description language that describes state modifications which require modeling of the changes in states to the core process. The formalized description language of an embodiment segregates all the procedural parts of the language from the declarative parts of the language so that procedures that modify state can only be triggered by well defined events as the automatically generated interactive system (also referred to herein as the "data collection tool") is operated. The use of declarative description language also functions to make analysis of the host process computationally tractable.

In the following description, numerous specific details are introduced to provide a thorough understanding of, and enabling description for, embodiments of the dialog system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1A shows a dialog system environment 100 that includes the interactive system 110, under an embodiment. The dialog system environment 100 includes a dialog system 120 coupled to a communication or voice connection 122 and configured to receive calls from callers 124 (e.g., customers) requesting information. For example, the dialog system 120 may be a spoken-dialog or natural language system configured to serve as an automated customer service interface to customers 124 calling in via a telephone number. The dialog system 120 is coupled or connected to a dialog data system 130; alternatively, the dialog data system 130 may be a component of the dialog system 120. The dialog data system 130 is configured to collect data of interactions between callers 124 and the automated dialog system 120, and the data representing the interactions is referred to herein as dialog data.

The dialog data system 130 is coupled or connected 132 to an operator 134 who, during interactions between the dialog system 120 and callers 124, can control data collected at the dialog data system 130 and responses (e.g., synthesized speech responses) of the dialog system 120 to voice information spoken by the caller 124. The voice information can include statements and questions, to name few, but is not so limited. In controlling the dialog data system 130, the operator 134 uses the interactive system 110, also referred to as the GUI 110, to control the dialog system 120. The GUI 110 of an embodiment is configured as an interface for controlling the receipt of information from callers 124 and generation by the dialog system 120 of synthesized speech prompts to callers 124 and, in so doing, includes templates that include or provide prompts for guiding an operator 134 through numerous tasks. The operations and/or choices available to the interactive system operator 134 and provided via the GUI 110 are specified in the script, and hence are context-dependent. The GUI 110 also may include a graphical depiction of relationships among tasks of the task flow. The GUI 110 is also configured as an interface to a data infrastructure (e.g., information technology infrastructure) of the dialog data system 130.

Figure 1B:
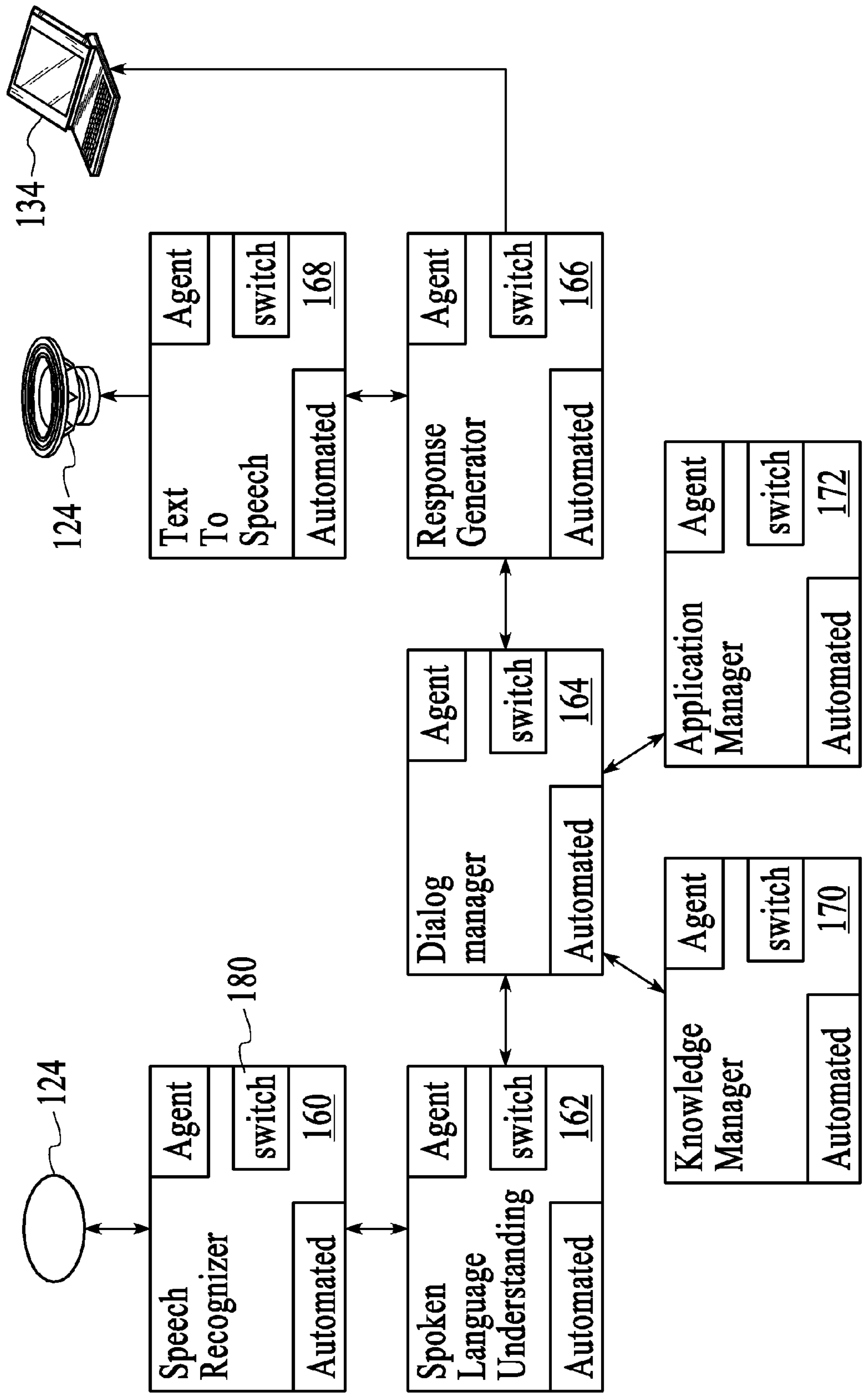
FIG. 1B is a detailed diagram of components of the dialog system environment that includes the interactive system, under an embodiment.
Figure 1C:
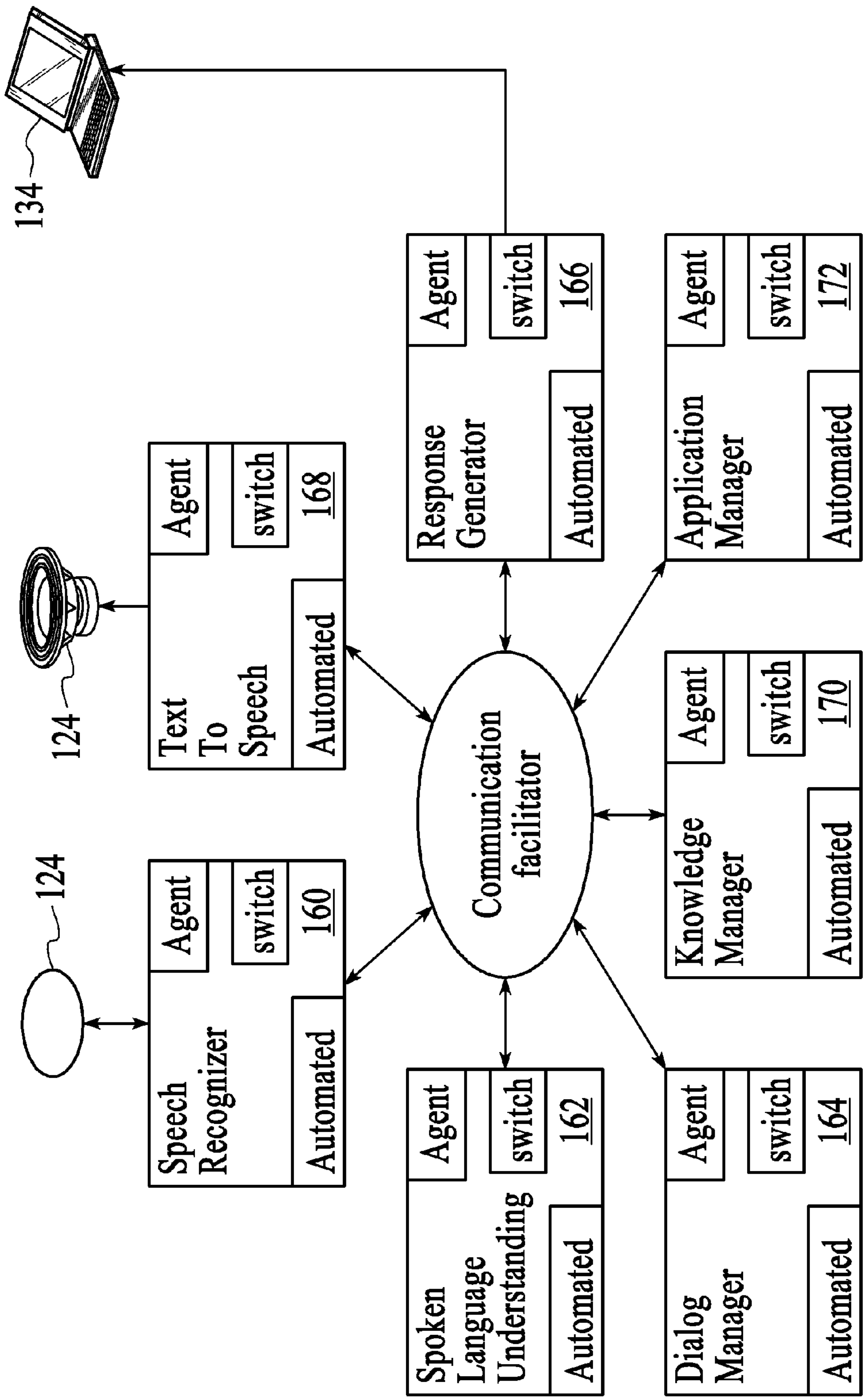
FIG. 1C is a detailed diagram of components of the dialog system environment that includes the interactive system in an alternative configuration, under an alternative embodiment.

FIG. 1B is a detailed diagram of components of the dialog system environment 100 that includes the interactive system, under an embodiment. FIG. 1C is a detailed diagram of components of the dialog system environment 100 that includes the interactive system in an alternative configuration, under an alternative embodiment. Components of the dialog system environment 100 can be implemented in a distributed computing system comprising a number of computers or workstations coupled together over a network. Alternatively, the functional blocks of the dialog system environment 100 can be implemented in a single computer that represents a unitary dialog system.

For the embodiment illustrated in FIG. 1B, the dialog system 120, dialog data system 130, and interactive system 110 includes several modules or components 160-172. These components include, but are not limited to, a speech recognizer module 160, a language understanding module 162 (also referred to as a "spoken language understanding module"), a dialog manager module 164, a response generator module 166, a text-to-speech module 168 (also referred to as a speech synthesis module), a knowledge manager module 170, and an application manager module 172. The components 160-172 are an example of a system that can be used in both a speech-based dialog system and text-based (e.g., computer input) dialog system. It should be noted that the speech recognizer module 160 and the text-to-speech module 168 are necessary only in spoken dialog systems. A text or graphics-based dialog system may instead have one or more text input and output display modules in place of the speech recognizer module 160 and text-to-speech module 168. Each management module of FIG. 1B may also be referred to simply as a "manager".

In an embodiment for speech-based systems, the speech recognizer module 160 takes in acoustic signals comprising the user's spoken words and outputs a sequence or a lattice of words with additional labels, such as confidence scores. The language understanding module 162 takes the sequence or a lattice of words with attached confidence scores from the speech recognizer module 160 and outputs a structured meaning representation, based on a statistical model trained on in-domain linguistic data and the available knowledge base. The dialog manager module 164 takes the structured meaning representations from the language understanding module 162 and interprets them in context to issue appropriate instructions to the other modules based on the context and its knowledge base.

The dialog manager module 164 uses a dialog-move approach to maintain dialog context, which is then used to interpret incoming utterances (including fragments and revisions), resolve noun phrases, construct salient responses, track issues, etc. A dialog state can also be used to bias speech recognition expectations and improve speech recognition performance. In a typical interaction, the dialog manager module 164 converts a user's query into a semantic frame (i.e. a set of semantic constraints) and sends this to the knowledge manager module 170.

The response generator module 166 (also referred to as a "language generation module") takes the content from the dialog manager module 164 and organizes it in a succinct and grammatical way for the text-to-speech module 168. The text-to-speech module 168 takes the word sequences with tagged features and produces speech waveforms for output through speakers or similar sound generation devices. The interactive system 110 is coupled to or is a component of the response generator module 166 of an embodiment.

The modules 160-172 are configured for automatic operation and for operation under control of an agent. While all modules 160-172 of the embodiment shown are configured for automatic operation and for operation under control of an agent, alternative embodiments can have some number of modules configured only for automatic operation and some number of other modules configured for automatic operation and for operation under control of an agent. Additional alternative embodiments can have some number of modules configured only for automatic operation, some number of other modules configured only for operation under control of an agent, and some number of other modules configured for automatic operation and for operation under control of an agent.

The control of a module between automatic operation and the operator (or "agent" in FIGS. 1A and 1B) in a particular module is controlled by a controller 180 or "switch" 180 in the module. Alternatively, the controller 180 can be in another component of the system and coupled to the module. In yet other alternative, a single controller can control operation of more than one module. The controller 180 detects abnormality in the output from a module operating in the automatic mode, and determines whether the module should be switched from the automatic mode to operating under control of an agent (CSR). The abnormality is computed, for example, through a confidence measure or other methods. Under the confidence measure, if the confidence is low, an indicator (e.g., a button turns to red, a button starts to flash, etc.) is activated or turned on; the indicator is a component of the GUI of an embodiment, but is not so limited. The agent can push a "wait" button or icon on the GUI, and this results in transmission of an instruction such as "please wait" or "wait a moment" through the text-to-speech (TTS) module to the caller. Then, the agent can correct the output from the particular module via the GUI and pass the corrected output to one or more downstream modules in the processing path or flow.

The confidence for a particular module is typically a posterior probability (e.g., P(output of module X is correct|the input to module X, and the dialog context). Examples of such confidence scores capable of being used in an embodiment can be found in the United States patent application titled "METHOD AND SYSTEM FOR COMPUTING OR DETERMINING CONFIDENCE SCORES FOR PARSE TREES AT ALL LEVELS", application Ser. No. 11/881,464.

Other methods for detecting abnormality in operation of a module can include the use of the number of times certain utterances or dialog patterns are repeated. If a type of phenomena (e.g., an utterance, a portion of an utterance, a semantic slot, or a dialog subsequence) is repeated several times, the particular module responsible for processing can signal to the agent so the agent can decide whether to switch to the "agent" mode. The number of repeats can be type-dependent and, for example, can have a value of two (2) or three (3).

In an alternative embodiment, as described above, the controller can be a module cluster level controller. Using a cluster controller, when the accumulated confidence or other measure indicative of abnormality of a cluster of modules is low, the agent is notified using the signal and can react by initiating transmission of a sentence such as "please wait" or "wait a moment" through the text-to-speech (TTS) module to the caller. Then, the agent can correct the output from the module cluster and pass the corrected output to the a downstream module in the processing path or flow.

Figure 2:
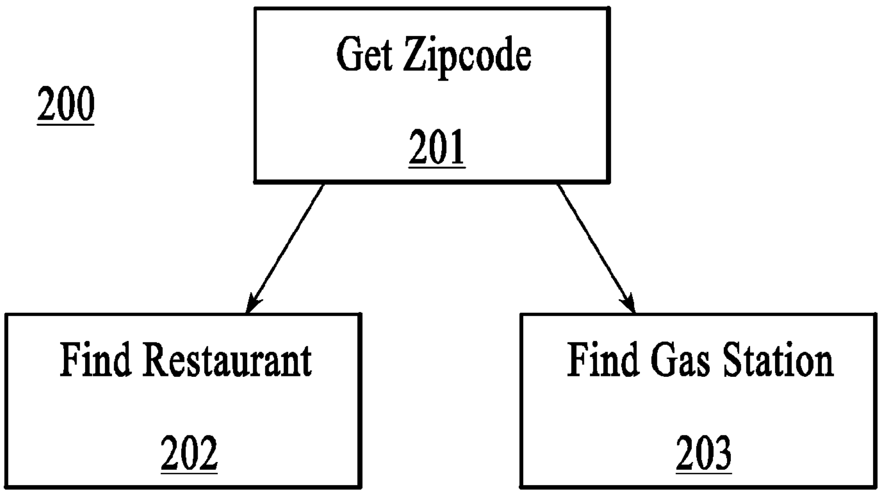
FIG. 2 is an example task flow, under an embodiment.

The GUI 110 is automatically generated from a formal description 140 of the desired process. The GUI 110 can be automatically generated in whole or in part by the dialog system 120, dialog data system 130, and/or other processor-based system connected or coupled to the dialog system 120 and/or dialog data system 130. The description includes a work flow or task flow description 150 of the desired process. FIG. 2 is an example task flow 200, under an embodiment. The task flow 200 includes a first task 201 (e.g., "Get Zip code") that, when completed, leads to one of a second task 202 (e.g., "Find restaurant") and a third task 203 (e.g., "Find gas station"). A task flow hereunder can include any number of tasks in any combination or sequence. The desired process includes controlling data collected by the dialog data system as well as outputs synthesized by the dialog system and transmitted to the caller.

A formal description of the task flow is generated from the task flow using a formalized description language. The formalized description language includes a formal description of numerous parameters of the task flow including, but not limited to, a set of tasks, a starting task, the relationship between the tasks, procedures or processes to be triggered as the interactive system steps through different tasks, and memory allocations necessary to maintain state of the interactive system. Tasks are also further described in the formal description by specifying conditions that are to be satisfied before tasks can be entered, conditions that need to be satisfied before tasks can be completed, annotations and descriptions of the task for human as opposed to computer consumption, whether the task is undoable, inputs associated with the task, vocalized speech patterns associated with the task, and the display of state associated with the task. Other constructs, such as variables, assignments, conditional loops, and other parameters appropriate to the work flow or task flow are included in the formal description but the formal description is not so limited.

Figure 3:
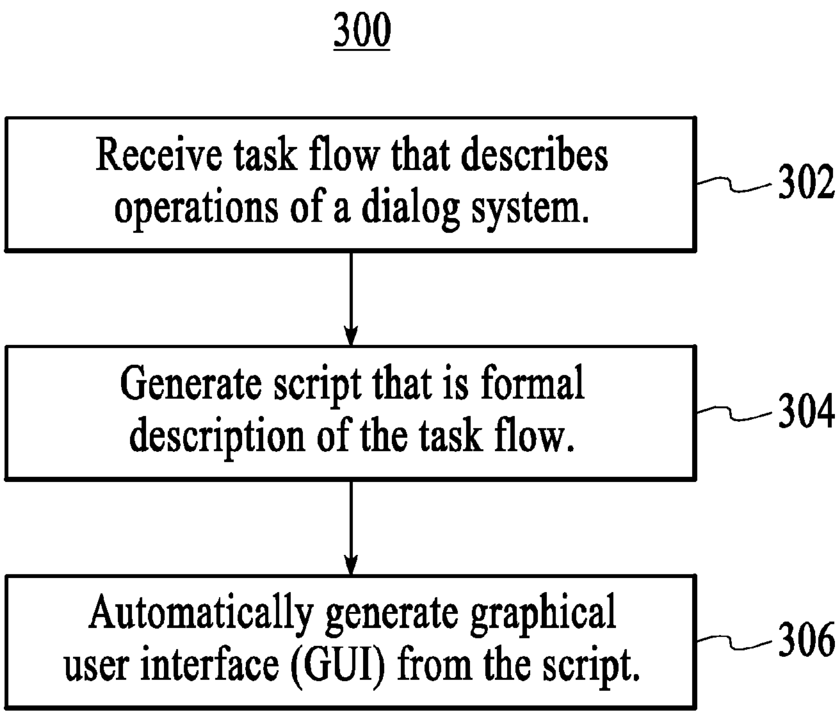
FIG. 3 is a flow diagram for automatically generating the interactive system from a task flow, under an embodiment.

FIG. 3 is a flow diagram for automatically generating 300 the interactive system, under an embodiment. Generation of the interactive system, which is configured for collecting dialog data of human-machine interactions in dialog systems, comprises receiving 302 a task flow. The task flow describes operations of a dialog system. A script is generated 304 that is a formal description of the task flow. The interactive system, or GUI, is automatically generated 306 from the script. The GUI includes templates for control of the dialog system and real-time collection and annotating dialog data during a live dialog between only the dialog system and callers to the dialog system. The dialog data includes data of the live dialog.

Figure 4:
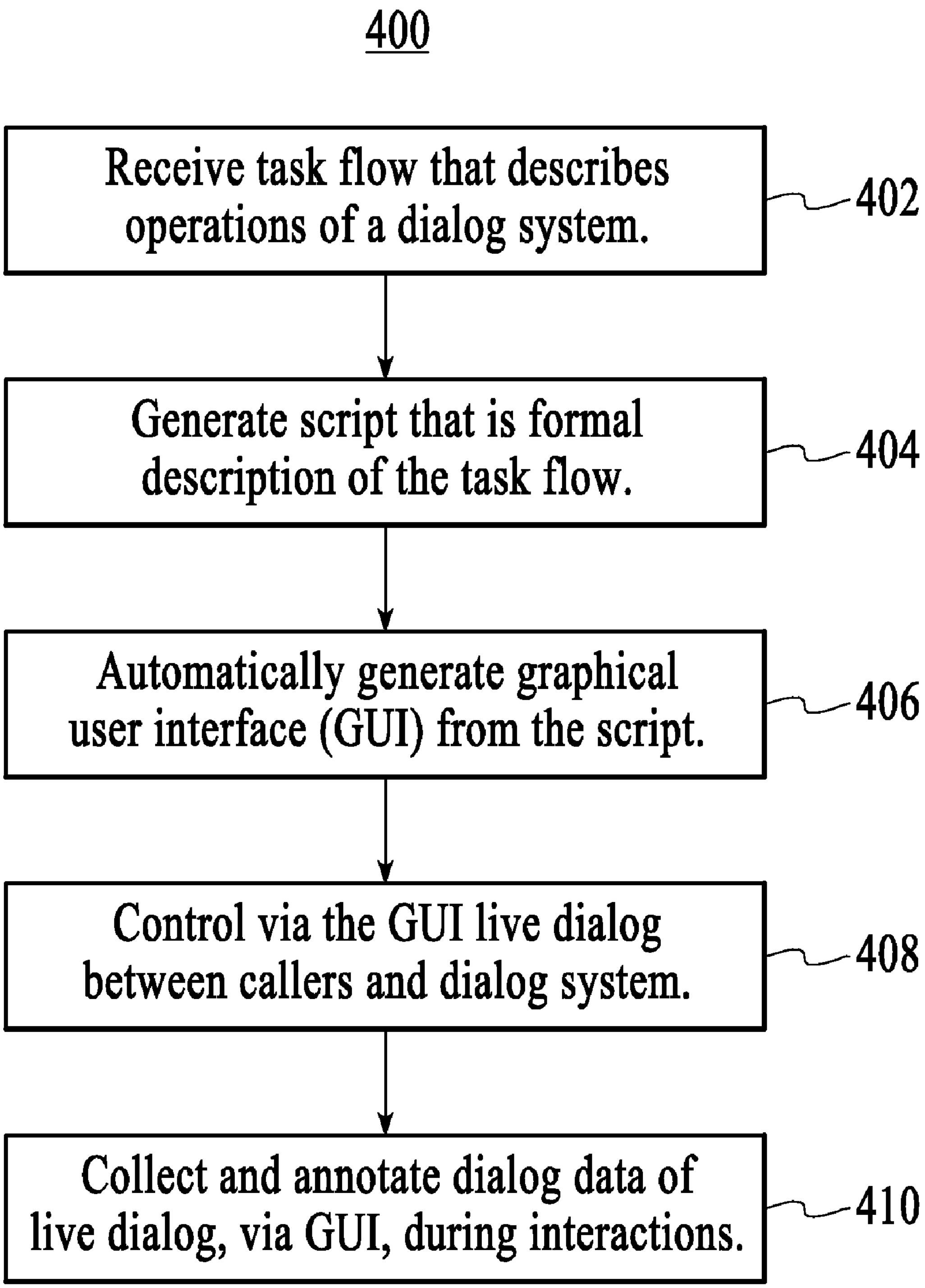
FIG. 4 is a flow diagram for collecting dialog data using the interactive system, under an embodiment.

FIG. 4 is a flow diagram for collecting dialog data 400 using the interactive system, under an embodiment. Generation of the interactive system, which is configured for collecting dialog data of human-machine interactions in dialog systems, comprises receiving 402 a task flow. The dialog data includes data of the live dialog. The task flow describes operations of a dialog system. A script is generated 404 that is a formal description of the task flow. The interactive system, or GUI, is automatically generated 406 from the script. Live dialog between only callers and the dialog system is controlled 408 via the GUI using templates and prompts. Information presented in the GUI is also used for real-time collection and annotating 410 of dialog data during the live dialog between only the dialog system and callers to the dialog system.

The interactive system of an embodiment, as described herein, provides an automated approach for generating interactive systems from formal description of a task or work flow. The generated interactive systems provide limited choices to the system operators or agents. The choices provided to the operators are context-dependent and specified in scripts defined by a formal description language corresponding to the formal description and the task flow. The generated interactive systems are deployed in real-time for use by operators in handling real calls from real users. The dialogs between the interactive systems and callers are logged into files in real-time or near real-time. The choices made by human operators while using the automatically generated interactive systems are converted automatically to annotations for the logged dialog data.

A formal description of the task flow is generated from the task flow using a formalized description language or script, as described above. The formalized description language, referred to herein as Wizard-of-Oz (WOZ) markup language (WML), includes a formal description of numerous parameters of the task flow. A detailed description of the WML or formalized description language of an embodiment follows.

Figure 5:
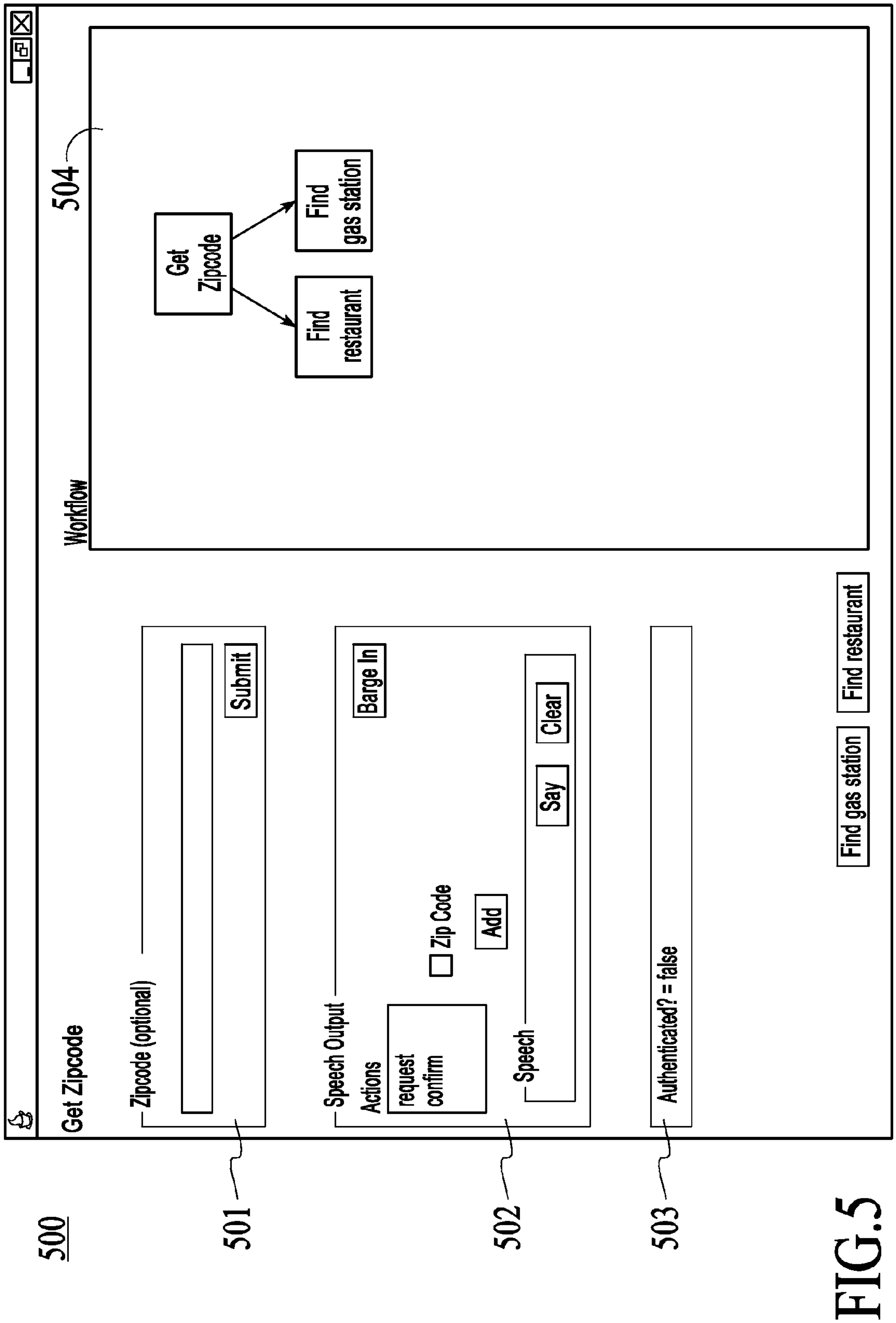
FIG. 5 is an example template or page from a GUI, under an embodiment.

FIG. 5 is an example template or page 500 from a GUI, under an embodiment. The pages or templates of the GUI 500 of an embodiment generally include four sections or portions 501-504. A first portion 501 of the GUI 500 is referred to as an input panel and is configured to allow a customer service representative to input information received from a caller. A second portion 502 of the GUI 500 is referred to as the speech output panel and is configured to allow a customer service representative to control synthesized speech outputs of the dialog system. A third portion 503 of the GUI 500 is referred to as the status panel and is configured to present a customer service representative with status information of the current task. A fourth portion 504 of the GUI 500 is referred to as the workflow panel and is configured to present a customer service representative with an overview of the tasks of the current workflow. In this example GUI 500, the first portion 501 is the upper left-most portion of the GUI, the second portion 502 is the center left-most portion of the GUI, the third portion 503 is the lower left-most portion of the GUI, and the fourth portion 504 is the right-most portion of the GUI, but alternative embodiments can configure the GUI to include any configuration that accommodates the four sections described herein.

The example GUI 500 is generated automatically from the following example formalized description or script under the WML of an embodiment. The components of the script are described in detail following this example script, and the description of the script components apply to all scripts generated under the description herein.

```
<?xml version="1.0" encoding="UTF-8"?>
<!DOCTYPE process SYSTEM "../wml.dtd">
<process>
  <vars>
    <var name="zipcode" />
    <var name="gasStation" />
    <var name="restaurant" />
    <var name="isAuthenticated" value="false" />
  </vars>
  <start>
    <task id="getZip" label="Get Zipcode" next="task2,task3" post-
    Condition="isAuthenticated==true">
     <inputs>
      <script trigger="onSubmit" type="application/javascript"
>
      isAuthenticated = Packages.com.bosch.DBA.verify(zipcode)
        </script>
        <input label="Zipcode" var="zipcode"/>
     </inputs>
```

-continued

```
        <speechOutput>
            <template type="request, confirm" >
                <templateVar var="zipcode" label="Zipcode" />
            </template>
        </speechOutput>
        <outputs>
          <output var="isAuthenticated" label="Authenticated?"
/>
        </outputs>
      </task>
    </start>
    <task id="task2" label="Find gas station">
      <inputs>
        <script trigger="onSubmit" type="application/javascript"
>
        results = Packages.com.bosch.DBA.findGasStation(zipcode,
gasStation)
        </script>
        <input label="Gas station name" var="gasStation"/>
      </inputs>
    </task>
    <task id="task3" label="Find restaurant">
      <inputs>
        <script trigger="onSubmit" type="application/javascript"
>
        results = Packages.com.bosch.DBA.findRestaurant(zipcode,
restaurant)
        </script>
        <input label="Restaurant Name" var="restaurant"/>
      </inputs>
    </task>
    </process>
```

A description of components of the script described above, with reference to GUI 500, begins with an understanding that the root element of a WML file is a process tag and inside the process tag there can be a "vars" tag, a "start" tag, and multiple "task" tags to name a few. Variables are declared using information inside the vars tag of an embodiment. The start tag surrounds the task in which the GUI will start. Information of the task tag describes a task that the operator or customer service representative will control.

The "inputs" tag describes the input panel portion of the GUI, as described above, where the customer service representative can enter information like, for example, information received from a caller. Tags associated with the inputs tag include "input tags" in an embodiment. The label attribute of the input tags, which is optional, specifies the human-readable label on the GUI input panel associated with the input.

A "script" tag surrounds scripting code in an embodiment. The "trigger" attribute of the script tag defines when the code is executed. The triggers of an embodiment include but are not limited to "onLoad", "onEnter", "onExit", and "onSubmit". The onLoad scripts are executed when the WML script is being loaded. The onEnter scripts are executed when the surround task is entered. The onExit scripts are executed when the surrounding task is exited. The onSubmit scripts are executed when the customer service representative clicks submit in the surrounding inputs tag. The "type" attribute defines the type of the scripting language. JavaScript is the scripting language of an embodiment, but the embodiment is not so limited.

The "input" tag represents text fields that the customer service representative can use to input data to the system, as described above. The "label" attribute of the input tag represents a human readable label for the text input field. The "var" attribute of the input tag directs the interpreter to store the text in the text field in the variable corresponding to this identification. The "mode" attribute of the input tag can be configured as optional or required.

The "speechOutput" tag surrounds the template tag of an embodiment. The speechOutput tag has no attributes, but is not so limited.

The "template" tag describes the list of speech actions available for use by the customer service representative. The list of speech actions is specified in the "type" attribute of the template tag. The list of speech action includes a comma-separated list of speech acts, for example. The child tag "templateVar" describes the variables that can be passed to a synthesized speech response generation component along with the speech acts.

The "templateVar" tag describes which variables can be passed to the speech response generation component along with a speech act (see the description of template tag above). The "var" attribute of the templateVar tag is the identification of variables. The "label" attribute of the templateVar tag defines the human readable label that is displayed on the GUI. The "slotName" attribute of the templateVar tag, which is optional, defines a mapping from the variable to a slot name in the speech response generation component; if the slotName attribute is not present, the slot name defaults to the variable identification.

The "output" tag defines the variables to be displayed on the GUI. The "var" attribute of the output tag defines which variable is displayed. The label attribute of the output tag, which is optional, defines the label associated with the output.

The "output" tag described above is surrounded by an "outputs" tag. The outputs tag can include one optional attribute which is "label". The label attribute of the outputs tag, which is optional, defines the label on the GUI associated with the outputs panel.

The example template of the GUI 500 described above is an example of an interactive system automatically generated from a formalized description language. The GUI, once generated, is used by a customer service representative (CSR) to control interactions between humans and a host dialog system and to collect and annotate dialog data of the human-machine interactions. Referring to GUI 500, the workflow includes the task of getting a zip code from the caller. Using the zip code received from the caller, the workflow can transition to a task of finding a restaurant corresponding to the zip code and/or finding a gas station corresponding to the zip code.

In operation, a call is received from a caller, and the CSR uses the speech output portion 502 of the template to control the dialog. Using the second portion 502 ("Speech Output") of the GUI 500, the CSR can select the "Zip code" box, select or highlight the "Request" action ("Actions"), and select the "Say" command ("Speech"). In response to these selections by the CSR, the interactive system causes the dialog system to generate or synthesize a voice prompt to the caller requesting the zip code corresponding to a geographical area of interest. When the caller provides the zip code of interest, the CSR manually enters the zip code into the "Zip code (optional)" field in the first portion 501 of the GUI 500. Following entry of the received zip code information, the CSR uses the second portion 502 of the GUI 500 to select the "Confirm" action followed by the "Say" action, and this causes the dialog system to generate a voice prompt to the caller reciting the received zip code. The received zip code is authenticated by the interactive system and/or dialog system and, assuming it is a valid zip code, the "Find gas station" and/or "Find restaurant" tasks will be active and available for selection via the GUI 500 by the CSR.

Once active, the CSR can use the "Find gas station" and/or "Find restaurant" tasks to control the dialog system to generate voice outputs or prompts to the caller regarding information of gas stations and/or restaurants in the geographical area corresponding to the received zip code. Also, additional templates (not shown) of the GUI may allow the CSR to prompt the caller for additional information which can be used to provide the caller with refined information of the selection of gas stations or restaurants via the dialog system. The “Barge In” button in the second portion 502 of the GUI 500 allows the CSR to take over the call and talk directly with the caller if, at any time during the call, the CSR feels the caller is becoming frustrated or the dialog system and/or interactive system becomes unable to handle the call.

FIGS. 6A-6F show an example series of templates or pages 600A-600F from a GUI, under an embodiment. The pages or templates of the GUI 600A-600F (collectively “GUI 600”) are generally configured as described above with reference to GUI 500 (FIG. 5). For example, the pages or templates of the GUI 600X of an embodiment (where “600X” generally represents one or more of 600A-600F as appropriate to the template) generally include four sections or portions 601-604. A first portion 601 of the GUI 600X is referred to as an input panel and is configured to allow a customer service representative to input information received from a caller. A second portion 602 of the GUI 600X is referred to as the speech output panel and is configured to allow a customer service representative to control synthesized speech outputs of the dialog system. A third portion 603 of the GUI 600X is referred to as the status panel and is configured to present a customer service representative with status information of the current task. A fourth portion 604 of the GUI 600X is referred to as the workflow panel and is configured to present a customer service representative with an overview of the tasks of the current workflow. In this example GUI 600X, the first portion 601 is the upper left-most portion of the GUI, the second portion 602 is the center left-most portion of the GUI, the third portion 603 is the lower left-most portion of the GUI, and the fourth portion 604 is the right-most portion of the GUI, but alternative embodiments can configure the GUI to include any configuration that accommodates the four sections described herein.

The example GUI 600A-600F is generated automatically from the following example formalized description or script under the WML of an embodiment. The components of the script are described in detail above, and the above description of the script components apply to all scripts generated under the description herein.

```
<?xml version=“1.0” ?>
<!DOCTYPE process SYSTEM “../wml.dtd”>
<process>
    <vars>
        <var name=“desiredTask” />
        <var name=“accountNumber” />
        <var name=“companyName” />
        <var name=“zipcode” />
        <var name=“telephoneNumber” />
        <var name=“cityName” />
        <var name=“isAuthenticated” value=“false” />
        <var name=“streetAddress” />
        <var name=“orderNumber” />
        <var name=“numOfOrders” />
        <var name=“orders” />
        <var name=“currentOrder” />
        <var name=“productId” value=“” />
        <var name=“orderStatus” value=“” />
        <var name=“orderDate” value=“” />
        <var name=“reportNextOrder” value=“&quot;check next order
status&quot;” />
        <var name=“doneWithThisCustomer” value=“false” />
    </vars>
    <start>
```

-continued

```
        <task id=“start” label=“Start” next=“authenticate,quit”
            undoable=“true”
            description=“When entering this task, start-over every-
thing”>
            <script trigger=“onEnter” type=“application/javascript” >
                    desiredTask = “”;
                    accountNumber = “”;
                    companyName = “”;
                    zipcode = “”;
                    telephoneNumber = “”;
                    cityName = “”;
                    isAuthenticated = false;
                    streetAddress = “”;
                    orderNumber = “”;
                    numOfOrders = “”;
                    orders = “”;
                    currentOrder = “”;
                    productId= “”;
                    orderStatus = “”;
                    orderDate = “”;
                    reportNextOrder = “”;
            </script>
            <speechOutput>
                <template type=“greeting”>
                </template>
            </speechOutput>
        </task>
    </start>
    <task id=“quit” label=“Quit”></task>
    <task id=“authenticate”
        description=“Company info must be inputted,
    Submit button must be clicked before Check Status button can be
activated.”
        label=“Authenticate” next=“checkStatus, checkInventory, check-
Price”
        postCondition=“isAuthenticated==true” undoable=“false”>
        <inputs label=“Company Information”>
            <script trigger=“onSubmit” type=“application/javascript”
>
                    Packages.com.bosch.TTS.say(“Retrieving your
account information. Please wait...”);
                    queryResult = Packages.com.
bosch.QueryInterface.verify(accountNumber, companyName zipcode);
                    isAuthenticated = queryResult.isVerified( );
                    if (isAuthenticated) {
                        accountNumber = queryResult.
getAccountNumber( );
                        companyName = queryResult.
getCompanyName( );
                        cityName = queryResult.getCityName( );
                        Packages.com.bosch.TTS.say(“OK, your
company is ”+companyName+“ in ”+cityName);
                    } else {
                        Packages.com.bosch.TTS.say(“Sorry, we
can not retrieve your account with the information you provided.
Please try again.”);
                    }
            </script>
            <input label=“Accout Number” var=“accountNumber”
                mode=“optional” />
            <input label=“Company Name” var=“companyName”
                mode=“optional” />
            <input label=“Zip Code” var=“zipcode”
            mode=“optional” />
            <!-- <input label=“Telephone Number”
var=“telephoneNumber” mode=“optional” /> -->
        </inputs>
        <speechOutput>
            <template
                type=“Request,confirm”>
                <templateVar var=“accountNumber” label=“Account
Number” slotName=“account number”/>
                <templateVar var=“companyName” label=“Company
Name” slotName=“company name”/>
                <templateVar var=“zipcode” label=“Zip Code” slot-
Name=“zipcode”/>
                <!-- templateVar var=“telephoneNumber” label=
“Telephone Number” slotName=“telephone number”/ -->
            </template>
        </speechOutput>
```

-continued

```
        <outputs>
            <output label="Authentication Result"
var="isAuthenticated" />
            <output label="Account Number" var="accountNumber" />
            <output label="Company Name" var="companyName" />
            <output label="City" var="cityName" />
        </outputs>
    </task>
    <task id="checkStatus" label="Check Order Status" next="start,
report Order"
        preCondition="isAuthenticated==true">
            <script trigger="onEnter" type="application/javascript" >
                    numOfOrders = "N/A";
                    Packages.com.bosch.TTS.say("Let us now check
your order status");
            </script>
        <inputs>
            <script trigger="onSubmit" type="application/javascript"
>
                    orders = Packages
.com.bosch.QueryInterface.findOrder(accountNumber, orderNumber);
                    numOfOrders = orders.getTotalNumResults( );
                    Packages.com.bosch.TTS.say("You have
"+numOfOrders+" orders");
            </script>
            <input label="Order Number" var="orderNumber" />
        </inputs>
        <speechOutput>
            <template
                type="Request,Confirm">
                <templateVar var="orderNumber" label="Order
Number" slotName="purchase order number"/>
            </template>
        </speechOutput>
        <outputs label="Order Status">
            <output label="Number of Orders" var="numOfOrders"/>
        </outputs>
    </task>
    <task id="reportOrder" label="Report Order Status" next="start"
        preCondition="isAuthenticated==true">
            <script trigger="onEnter" type="application/javascript" >
                    currentOrder = 0;
                    orderStatus = "n/a";
                    reportNextOrder = "to check next order
status";
                    doneWithThisCustomer = true;
            </script>
        <inputs>
            <script trigger="onSubmit" type="application/javascript"
>
                if (currentOrder < numOfOrders) {
                  order = orders.getTheNthOrder(currentOrder);
                    orderStatus = order.getOrderStatus( );
                    orderNumber = order.getOrderNumber( );
                    orderDate = order.getOrderDate( );
                    currentOrder++;
                    Packages.com.bosch.TTS.say("Your order with
the number "+orderNumber+" placed on "+orderDate+" has already been
"+orderStatus);
                }
                else {
                    orderStatus = "N/A";
                    Packages.com.bosch.TTS.say("You have checked
all your order status");
                }
            </script>
        </inputs>
        <speechOutput>
            <template
                type="Confirm, anything_else">
                <templateVar var="reportNextOrder" label="Check
next order status" slotName="doing"/>
            </template>
        </speechOutput>
        <outputs label="Order Status">
            <output label="Order Status" var="orderStatus"/>
            <!-- output label="Product ID" var="productId"/ -->
            <output label="Order Date" var="orderDate"/>
            <output label="Order Number" var="orderNumber"/>
            <output label="Num of Orders" var="numOfOrders"/>
```

-continued

```
        </outputs>
    </task>
    <task id="checkInventory" label="Check Inventory" next="start"
        preCondition="isAuthenticated==true">
        <inputs>
            <input label="Order Number" var="orderNumber" />
        </inputs>
        <outputs label="Order Status">
        </outputs>
    </task>
    <task id="checkPrice" label="Check Price" next="start"
        preCondition="isAuthenticated==true">
        <inputs>
            <input label="Order Number" var="orderNumber" />
        </inputs>
        <outputs label="Order Status">
        </outputs>
    </task>
</process>
```

The example GUI 600 described above is an example of an interactive system automatically generated from a formalized description language. The GUI 600, once generated, is used by a customer service representative (CSR) to control interactions between humans and a host dialog system and to collect and annotate dialog data of the human-machine interactions. Referring to GUI 600A (FIG. 6A), the dialog workflow 604 includes a "Start" task with transitions to an "Authenticate" task and a "Quit" task. The authenticate task includes transitions to a "Check Price" task, a "Check Inventory" task, and a "Check Order Status" task, but the embodiment is not so limited.

In operation, a call is received from a caller, and the CSR uses the speech output portion of the template to control the dialog. Using the second portion 602 ("Speech Output") of the GUI 600, the CSR selects the "greeting" action, and selects the "Say" command ("Speech"). In response to these selections by the CSR, the interactive system causes the dialog system to generate or synthesize an initial greeting to the caller. Following play of the initial greeting by the dialog system, the interactive system allows the CSR to control a transition to the "Authenticate" task by activating the "Authenticate" button or icon on the GUI 600A. Selection of the authenticate task via the authenticate button results in presentation of GUI 600B to the CSR.

Figure 6A:
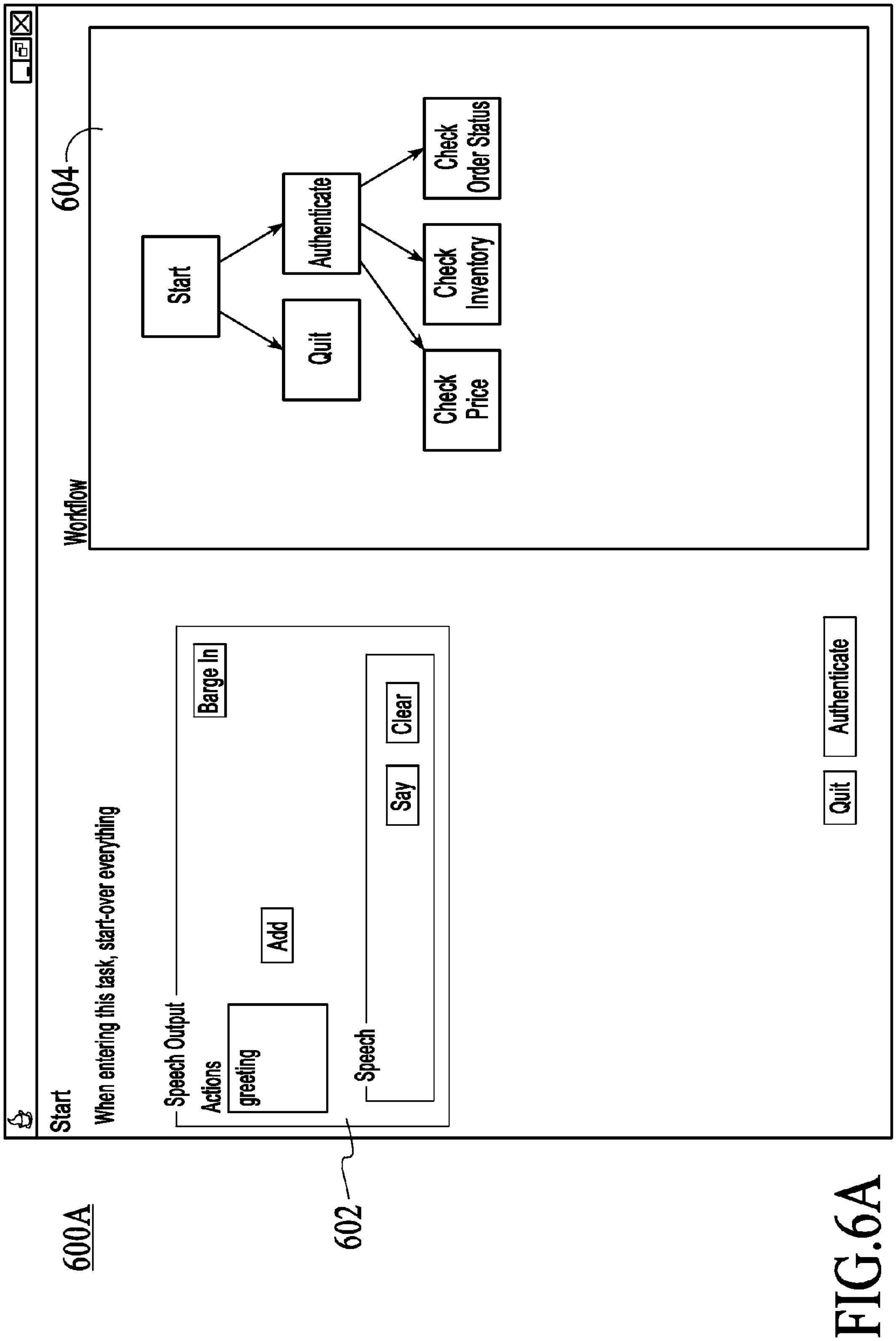
FIGS. 6A-6F show an example series of templates or pages from a GUI, under an embodiment.
Figure 6B:
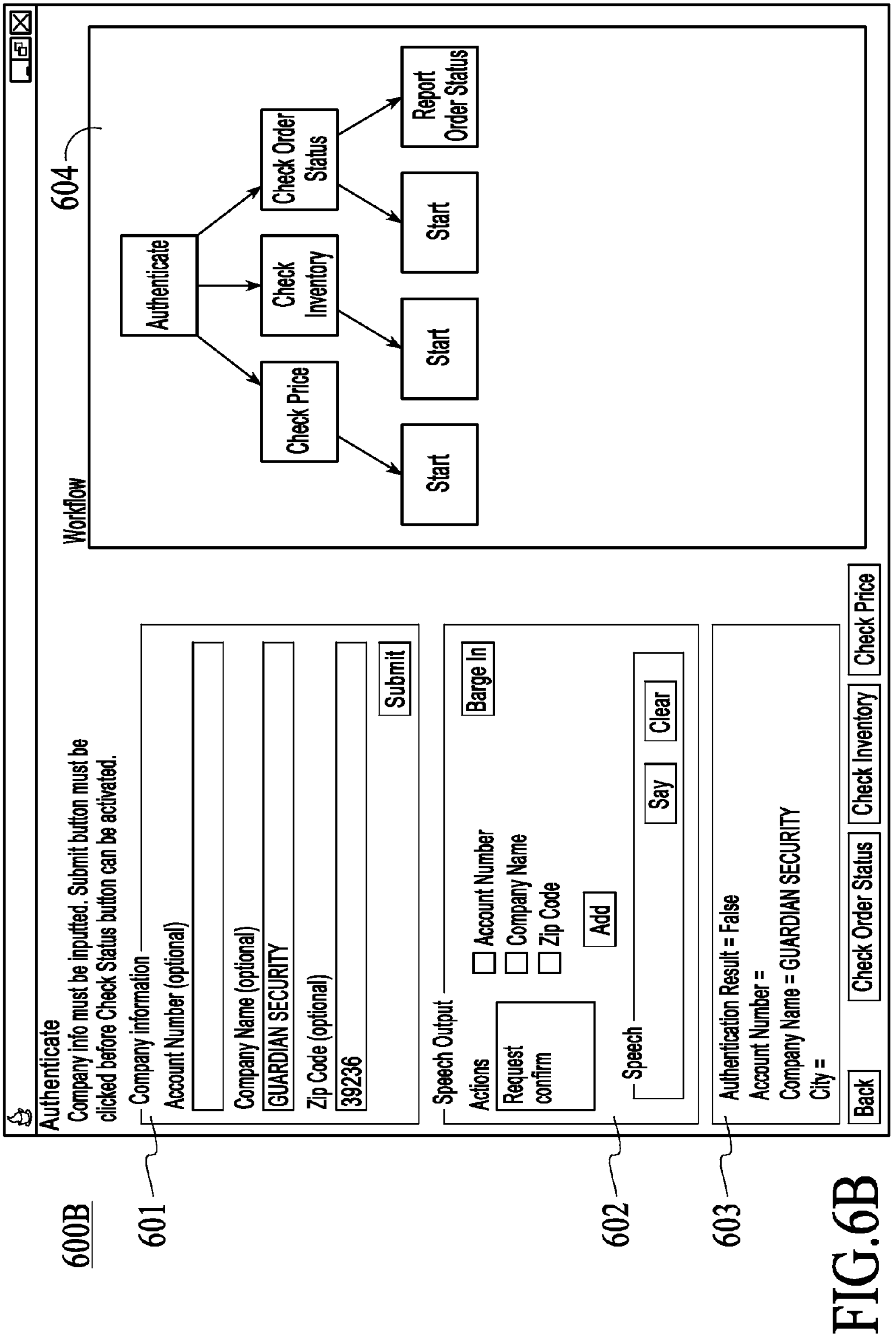
Figure 6C:
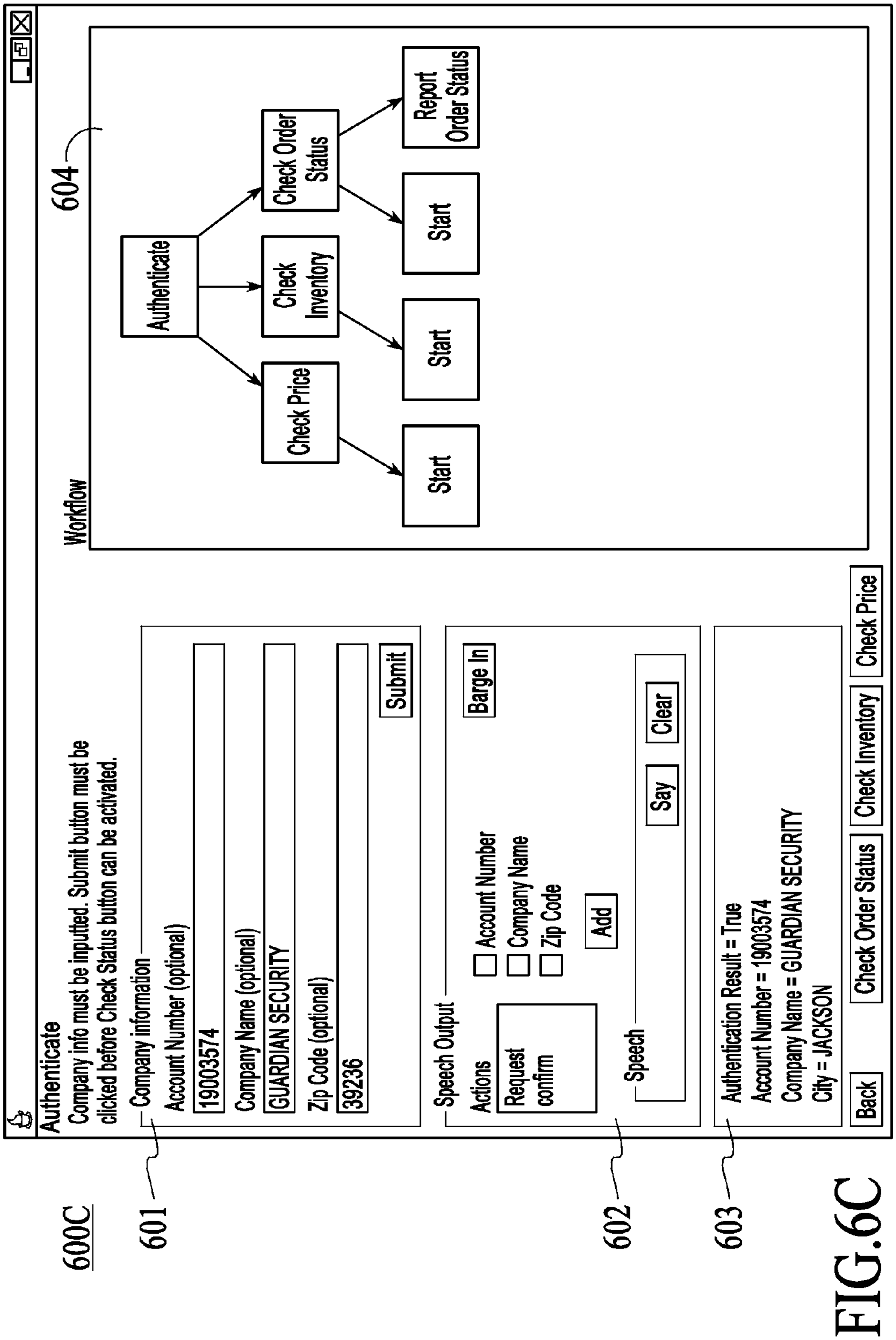
Figure 6D:
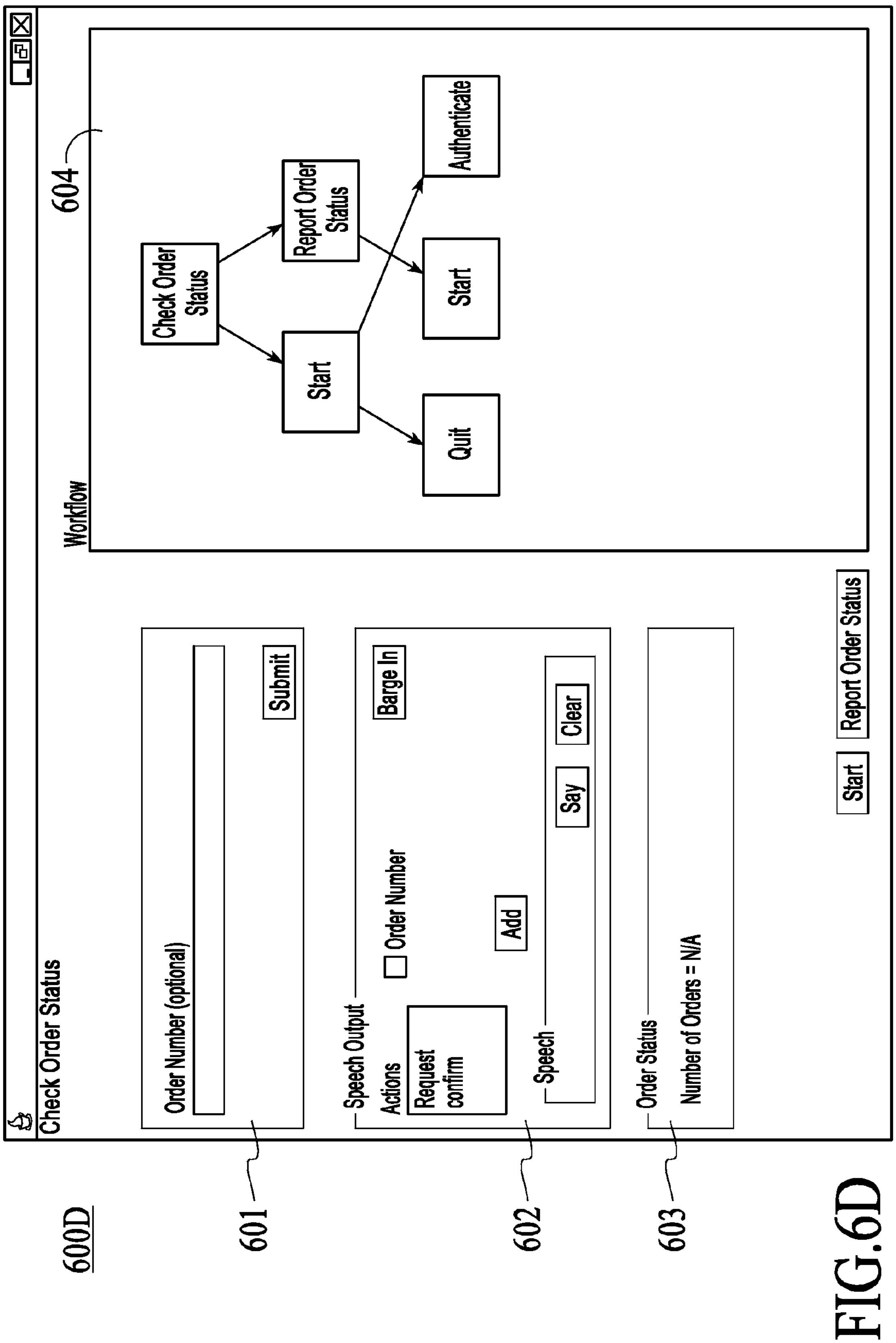
Figure 6E:
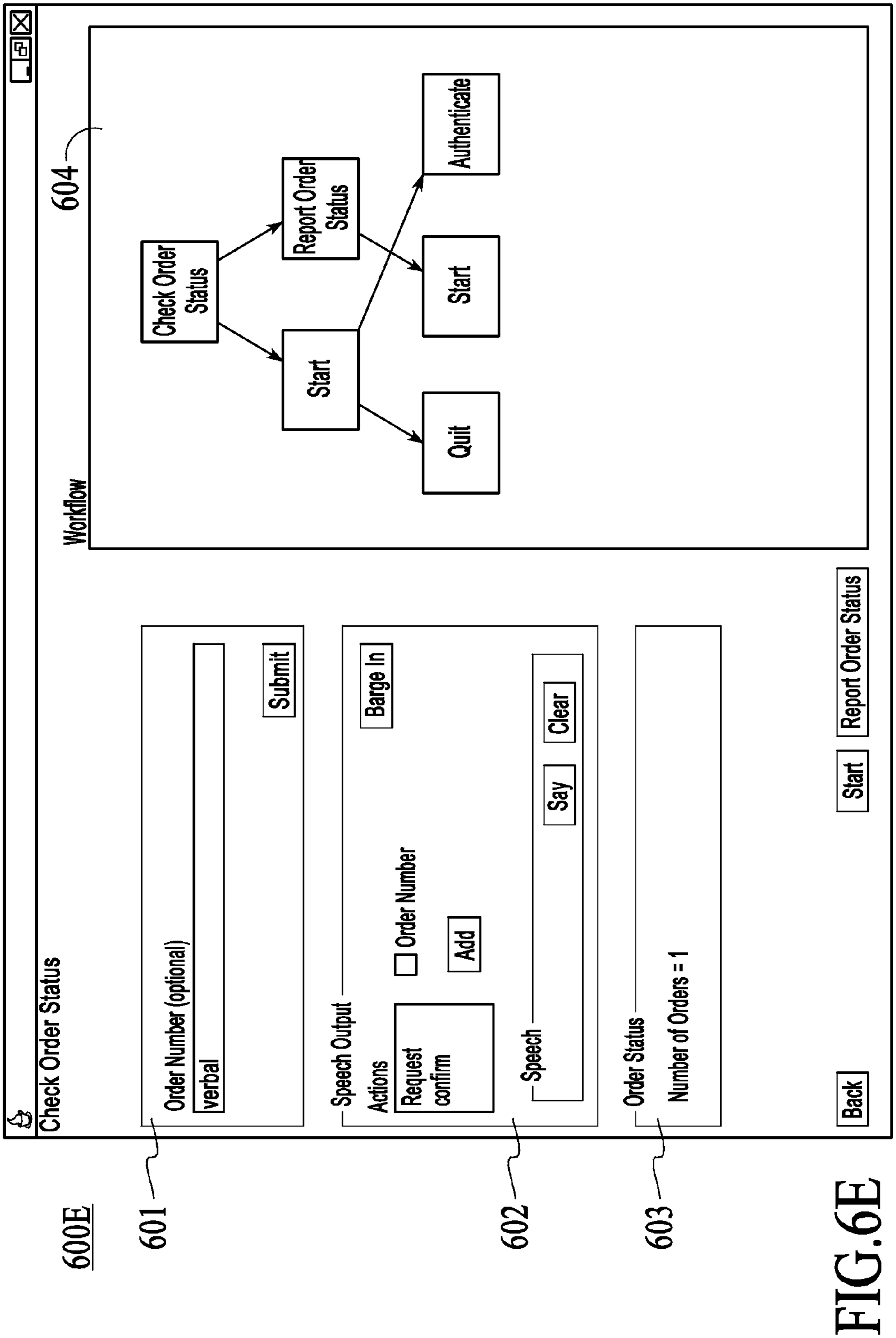
Figure 6F:
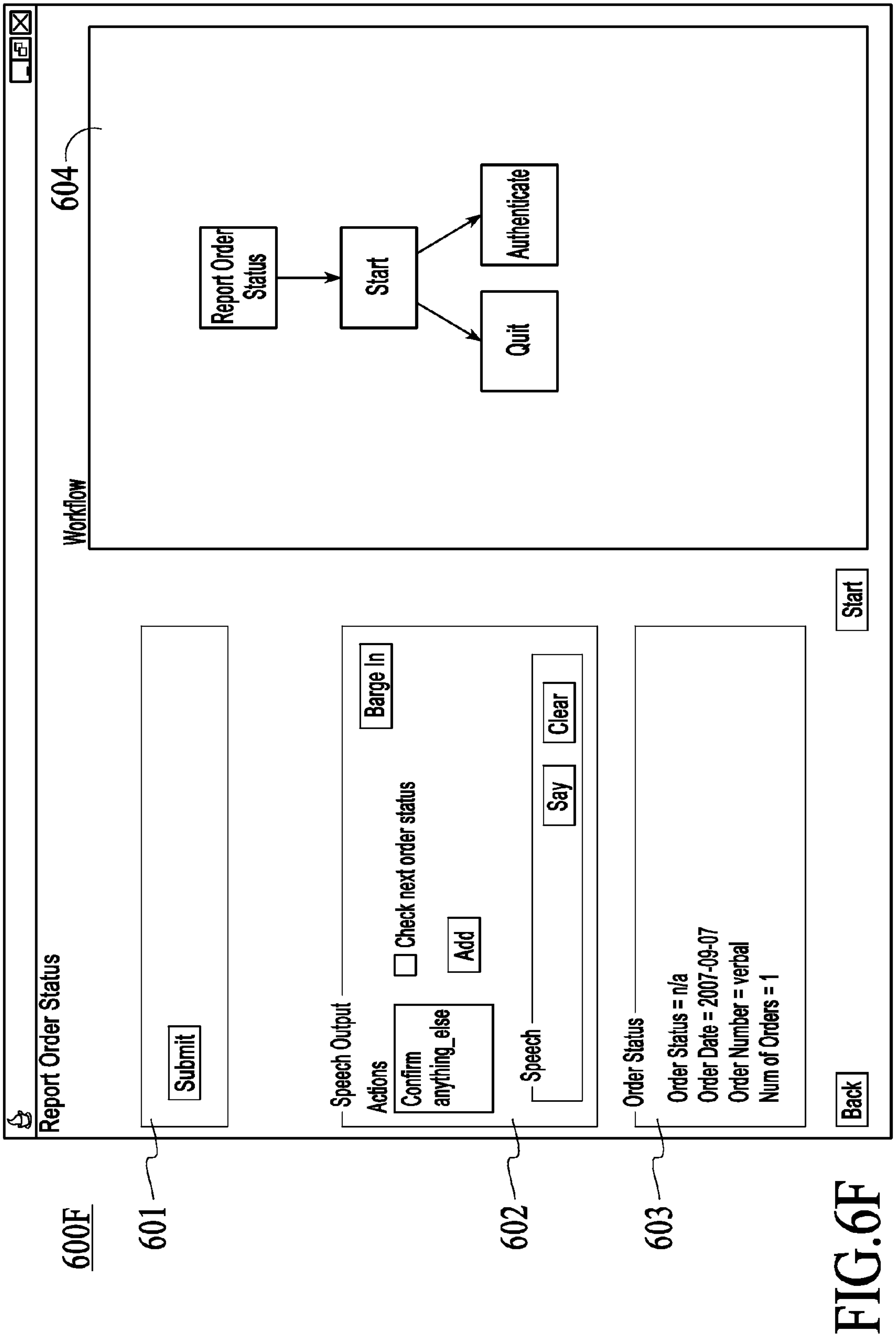

Referring to GUI 600B (FIG. 6B), the dialog workflow 604 includes an "Authenticate" task with transitions to a "Check Price" task, a "Check Inventory" task, and a "Check Order Status" task. The check price task and check inventory task each include a transition to a "Start" task (FIG. 6A). The check order status task includes transitions to the "Start" task and a "Report Order Status" task, but the embodiment is not so limited.

The CSR uses the GUI 600B to control the dialog during caller authentication. In this example, the caller has previously provided the company name and the zip code corresponding to the account about which he/she is seeking information, and the CSR has entered the information into the "Company Name (optional)" and "Zip Code (optional)" fields in the first portion 601 of the GUI 600, respectively. Using the second portion 602 ("Speech Output") of the GUI 600B, the CSR can select the "Account Number" box, select or highlight the "Request" action ("Actions"), and select the "Say" command ("Speech"). In response to these selections by the CSR, the interactive system causes the dialog system to generate or synthesize a voice prompt to the caller requesting the account number about which the caller is inquiring.

When the caller provides the account number, referring to GUI 600C (FIG. 6C), the CSR manually enters the account number into the "Account Number (optional)" field in the first portion 601 of the GUI 600. Following entry of the received account number information, the CSR uses the second portion 602 of the GUI 600C to select the "Account Number" box, and select the "Confirm" action ("Actions") followed by the "Say" action ("Speech"), and this causes the dialog system to generate a voice prompt to the caller reciting the received account number. The received account number is authenticated by the interactive system and/or dialog system and, assuming it is a valid account number, the "Check Order Status", "Check Inventory", and/or "Check Price" tasks are activated and made available for selection by the CSR via the GUI. Once active, the CSR can use "Check Order Status", "Check Inventory", and/or "Check Price" tasks to control the dialog system to generate voice outputs or prompts to the caller regarding information of order status, inventory, and price corresponding to the received account number.

The example continues when the CSR selects the "Check Order Status" task via GUI 600C in response to a request received from the caller. Referring to GUI 600D (FIG. 6D), the CSR uses the second portion 602 of the GUI 600D to select the "Order Number" box, and select the "Request" action ("Actions") followed by the "Say" action ("Speech"), and this causes the dialog system to generate a voice prompt to the caller requesting the order number about which the caller is requesting status.

In this example, the caller does not provide an order number in response to the dialog system prompt for an order number. Under this scenario, the CSR selects the "Submit" button via GUI 600D. These actions by the CSR cause the dialog system to present GUI 600E and to generate a voice prompt to the caller reporting the number of orders corresponding to the account information provided by the caller (account number, company name, and zip code provided via GUI 600C). The number of orders recited by the dialog system is shown in the "Order Status" portion (e.g., bottom portion) of the GUI 600E. Additionally, the dialog system generates a voice prompt to the caller requesting whether the caller desires order status information on all current orders.

When the caller responds that he/she does want order status information on all current orders, the CSR selects the "Report Order Status" task via the button presented in the bottom portion of the GUI 600E and, in response, the interactive system presents GUI 600F. The CSR uses GUI 600F to control the dialog system to generate a voice prompt to the caller that includes status information of all current orders.

Components of the interactive system and/or dialog system may couple to other components not shown in the figures herein. While the term "components" is generally used herein, it is understood that "components" include circuitry, components, modules, and/or any combination of circuitry, components, and/or modules as the terms are known in the art. While various components shown herein may be depicted as co-located, the embodiment is not to be so limited; the interactive system and/or dialog system of various alternative embodiments may distribute one or more functions provided by any described component among any number and/or type of components, modules, and/or circuitry.

While one of each of the components comprising the interactive system and/or dialog system are shown, various alternative embodiments include any number and/or combination of each of these components coupled in various configurations known in the art. Further, while the components of the interactive system and/or dialog system are shown as separate blocks, some or all of these blocks can be monolithically integrated onto a single chip, distributed among a number of chips or components of a host system, and/or provided by some combination of algorithms. The term "processor" as generally used herein refers to any logic processing unit, such as one or more CPUs, digital signal processors ("DSP"), application-specific integrated circuits ("ASIC"), etc.

The actual configuration of the interactive system and/or dialog system is as appropriate to the components, configuration, functionality, and/or form-factor of a host system; the couplings shown between components of the interactive system and/or dialog system therefore are representative only and are not to limit the interactive system and/or dialog system to the configuration shown. The interactive system and/or dialog system can be implemented in any combination of software algorithm(s), firmware, and hardware running on one or more processors, where the software can be stored on any suitable computer-readable medium, such as microcode stored in a semiconductor chip, on a computer-readable disk, or downloaded from a server and stored locally at the host device for example.

The interactive system and/or dialog system may couple among any combination of other components under program or algorithmic control, these other components including processors, memory devices, buses, controllers, input/output devices, communication systems, and displays to name a few. A coupled database may include any number, type, and/or combination of memory devices, including read-only memory ("ROM") and random access memory ("RAM"), but is not so limited.

The automatic generation of interactive systems of an embodiment includes a method that includes receiving a task flow that describes operations of a dialog system. The method of an embodiment comprises generating a script that is a formal description of the task flow. The method of an embodiment comprises automatically generating a graphical user interface (GUI) from the script. The GUI of an embodiment consists of templates for control of the dialog system and real-time collection and annotating of dialog data during a live dialog between only the dialog system and callers to the dialog system. The dialog data of an embodiment consists of data of the live dialog.

The method of an embodiment comprises training the dialog system using the dialog data.

The templates of an embodiment comprise prompts for guiding an operator through a plurality of tasks. The templates of an embodiment comprise a graphical depiction of relationships among a plurality of tasks of the task flow. The templates of an embodiment comprise an interface for controlling generation by the dialog system of synthesized speech prompts to the callers. The templates of an embodiment comprise an interface to a data infrastructure of the interactive system.

The real-time collection and annotating of an embodiment comprises providing via the GUI an interface for receiving and automatically annotating the dialog data from the caller.

The script of an embodiment comprises a formalized description language. The formalized description language of an embodiment is declarative.

The formalized description language of an embodiment segregates procedural portions and declarative portions of the formalized description language. Procedures of an embodiment that modify state of the interactive system can only be triggered by defined events of the interactive system.

The formal description of an embodiment includes a set of tasks. The formal description of an embodiment includes a starting task. The formal description of an embodiment includes relationship information of the tasks.

The formal description includes choices available to an operator for controlling the live dialog. The choices of an embodiment are context dependent.

The formal description of an embodiment includes procedures to be triggered as the live dialog progresses.

The formal description of an embodiment includes memory allocations for maintaining state of the interactive system.

The formal description of an embodiment includes conditions to be satisfied before task initiation.

The formal description of an embodiment includes conditions to be satisfied before task completion.

The formal description of an embodiment includes labels and descriptions of the tasks. The labels and descriptions of an embodiment are configured for presentation via the GUI.

The formal description of an embodiment includes inputs corresponding to each of the tasks.

The formal description of an embodiment includes outputs of the dialog system corresponding to each of the tasks.

The formal description of an embodiment includes states corresponding to each of the tasks.

The automatic generation of interactive systems of an embodiment includes a system comprising a graphical user interface (GUI) coupled to a dialog system and a processor. The system of an embodiment includes an interactive system coupled to the GUI and configured to receive a task flow that describes operations of the dialog system and generate a script that is a formal description of the task flow. The interactive system of an embodiment is configured to automatically generate the GUI from the script. The GUI of an embodiment is configured for an operator to control in real-time collection and annotating of dialog data during a live dialog between only the dialog system and callers to the dialog system. The dialog data of an embodiment consists of data of the live dialog.

The GUI of an embodiment comprises prompts for guiding an operator through a plurality of tasks. The GUI of an embodiment comprises a graphical depiction of relationships among the plurality of tasks of the task flow, an interface for controlling generation by the dialog system of synthesized speech prompts to the callers. The GUI of an embodiment comprises an interface to a data infrastructure of the interactive system.

The script of an embodiment comprises a formalized description language that is declarative. The formalized description language of an embodiment segregates procedural portions and declarative portions of the formalized description language. Procedures of an embodiment that modify state of the interactive system can only be triggered by defined events of the interactive system.

The formal description of an embodiment includes a set of tasks. The formal description of an embodiment includes a starting task. The formal description of an embodiment includes relationship information of the tasks.

The formal description of an embodiment includes choices available to an operator for controlling the live dialog and procedures to be triggered as the live dialog progresses. The choices of an embodiment are context dependent.

The formal description of an embodiment includes memory allocations for maintaining state of the interactive system.

The formal description of an embodiment includes conditions to be satisfied before task initiation and conditions to be satisfied before task completion.

The formal description of an embodiment includes labels and descriptions of the tasks. The labels and descriptions of an embodiment are configured for presentation via the GUI.

The formal description of an embodiment includes inputs corresponding to each of the tasks and outputs of the dialog system corresponding to each of the tasks.

The automatic generation of interactive systems of an embodiment includes a method comprising receiving a task flow that describes operations of a dialog system. The method of an embodiment comprises generating a script that is a formal description of the task flow. The method of an embodiment comprises automatically generating a graphical user interface (GUI) from the script. The method of an embodiment comprises controlling via the GUI a live dialog between callers and the dialog system. The method of an embodiment comprises collecting and annotating dialog data of the live dialog, via the GUI, during the interactions. The dialog data of an embodiment consists of data of the live dialog between only a dialog system and callers to the dialog system.

The control of modules in dialog systems of an embodiment includes a dialog system comprising a plurality of dialog modules that receive and process utterances from a speaker and generate synthetic speech or text outputs as responses to the utterances. The plurality of dialog modules of an embodiment includes a first dialog module coupled to provide an output to a second dialog module. The dialog system of an embodiment includes a controller coupled to the first dialog module. The controller of an embodiment detects an abnormal output of the first dialog module when the first dialog module is processing the utterances in an automatic mode and outputs a signal indicating the abnormal output. The dialog system of an embodiment includes an operator interface coupled to the plurality of dialog modules and the controller. The operator interface of an embodiment receives the signal. The operator interface of an embodiment comprises a mode control for a human agent to control the first dialog module through the controller by correcting the abnormal output and transferring a corrected output to the second dialog module. The corrected output of an embodiment is used in further processing the utterances.

The controls of the operator interface of an embodiment comprise a reply control for the human agent to generate and send a synthetic speech reply message to a caller in response to the abnormal output.

The controller of an embodiment detects the abnormal output using a confidence measure. The confidence measure of an embodiment is a posterior probability.

The controller of an embodiment detects the abnormal output using a measure of repeats of the utterances or dialog patterns.

The controller of an embodiment is a component of the first dialog module.

The controller of an embodiment is coupled to the plurality of dialog modules. The controller of an embodiment detects an abnormal output of any of the plurality of dialog modules when the plurality of dialog modules is processing the utterances in an automatic mode and outputs a signal indicating the abnormal output. The operator interface of an embodiment comprises a mode control for a human agent to control any of the plurality of dialog modules by correcting the abnormal output of any of the plurality of dialog modules and transferring a corrected output to a downstream dialog module that follows, in a processing path, the dialog module from which the abnormal output is detected. The corrected output of an embodiment is used in further processing the utterances.

The controller of an embodiment is a component of the plurality of dialog modules.

The plurality of dialog modules of an embodiment includes a dialog manager module and a language understanding module. The plurality of dialog modules of an embodiment includes a response generator module. The plurality of dialog modules of an embodiment includes a speech recognizer module. The plurality of dialog modules of an embodiment includes a text-to-speech module. The plurality of dialog modules of an embodiment includes a knowledge manager module. The plurality of dialog modules of an embodiment includes an application manager module.

The control of modules in dialog systems of an embodiment includes a system comprising a dialog module that receives and processes utterances from a speaker and outputs data used to generate synthetic speech outputs as responses to the utterances. The system of an embodiment includes a controller coupled to the dialog module. The controller of an embodiment detects an abnormal output of the dialog module when the dialog module is processing in an automatic mode. The controller of an embodiment comprises a mode control for an agent to control the dialog module by correcting the abnormal output and transferring a corrected output to a downstream dialog module that follows, in a processing path, the dialog module. The corrected output of an embodiment is used in further processing the utterances.

The system of an embodiment includes an interface coupled to the dialog module and the controller. The interface of an embodiment includes an indicator that displays a signal indicating presence of the abnormal output. The agent of an embodiment controls the dialog module using the interface.

The interface of an embodiment includes a reply control for the human agent to generate and send a synthetic speech reply message to a caller in response to the abnormal output.

The controller of an embodiment detects the abnormal output using an attribute that includes a confidence measure. The controller of an embodiment detects the abnormal output using an attribute that includes a posterior probability. The controller of an embodiment detects the abnormal output using an attribute that includes a number of repeats of the utterances.

The dialog module of an embodiment includes a dialog manager module. The dialog module of an embodiment includes a language understanding module. The dialog module of an embodiment includes a response generator module. The dialog module of an embodiment includes a speech recognizer module. The dialog module of an embodiment includes a text-to-speech module. The dialog module of an embodiment includes a knowledge manager module. The dialog module of an embodiment includes an application manager module.

The control of modules in dialog systems of an embodiment includes a method comprising receiving and processing utterances from a speaker and generating synthetic speech outputs as responses to the utterances using a plurality of dialog modules of a dialog system. The plurality of dialog modules of an embodiment includes a first dialog module coupled to provide an output to a second dialog module. The method of an embodiment comprises automatically detecting an abnormal output of the first dialog module when the first dialog module is processing the utterances in an automatic mode and outputting a signal indicating the abnormal output. The method of an embodiment comprises controlling the first dialog module in response to the signal by correcting the abnormal output and transferring a corrected output to the second dialog module. The corrected output of an embodiment is used in further processing the utterances.

The method of an embodiment comprises generating and sending a synthetic speech reply message to a caller in response to the abnormal output.

The automatically detecting of an embodiment comprises detecting the abnormal output using a confidence measure.

The automatically detecting of an embodiment comprises detecting the abnormal output using a measure of repeats of the utterances.

The automatically detecting of an embodiment comprises detecting the abnormal output of the plurality of dialog modules.

The plurality of dialog modules of an embodiment includes a dialog manager module. The plurality of dialog modules of an embodiment includes a language understanding module. The plurality of dialog modules of an embodiment includes a response generator module. The plurality of dialog modules of an embodiment includes a speech recognizer module. The plurality of dialog modules of an embodiment includes a text-to-speech module. The plurality of dialog modules of an embodiment includes a knowledge manager module. The plurality of dialog modules of an embodiment includes an application manager module.

The control of modules in dialog systems of an embodiment includes computer readable medium including executable instructions which when executed in a processing system control components of a dialog system by receiving and processing utterances from a speaker and generating synthetic speech outputs as responses to the utterances using a plurality of dialog modules of a dialog system. The plurality of dialog modules of an embodiment includes a first dialog module coupled to provide an output to a second dialog module. Execution of the instructions in a processing system control components of a dialog system by automatically detecting an abnormal output of the first dialog module when the first dialog module is processing the utterances in an automatic mode and outputting a signal indicating the abnormal output. Execution of the instructions in a processing system control components of a dialog system by controlling the first dialog module in response to the signal by correcting the abnormal output and transferring a corrected output to the second dialog module. The corrected output of an embodiment is used in further processing the utterances.

Aspects of the interactive system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the interactive system include: microcontrollers with memory (such as electronically erasable programmable read only memory (EEPROM)), embedded microprocessors, firmware, software, etc. Furthermore, aspects of the interactive system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the interactive system is not intended to be exhaustive or to limit the systems and methods to the precise forms disclosed. While specific embodiments of, and examples for, the interactive system are described herein for illustrative purposes, various equivalent modifications are possible within the scope of the systems and methods, as those skilled in the relevant art will recognize. The teachings of the interactive system provided herein can be applied to other systems and methods, not only for the systems and methods described above.

The elements and acts of the various embodiments described above can be combined to provide further embodiments. These and other changes can be made to the interactive system in light of the above detailed description.

In general, in the following claims, the terms used should not be construed to limit the interactive system to the specific embodiments disclosed in the specification and the claims, but should be construed to include all systems that operate under the claims. Accordingly, the interactive system is not limited by the disclosure, but instead the scope of the interactive system is to be determined entirely by the claims.

While certain aspects of the interactive system are presented below in certain claim forms, the inventors contemplate the various aspects of the interactive system in any number of claim forms. Accordingly, the inventors reserve the right to add additional claims after filing the application to pursue such additional claim forms for other aspects of the interactive system.

What is claimed is:

1. A dialog system comprising:

a plurality of dialog modules in a processor of the dialog system that receive and process utterances from a speaker and generate synthetic speech or text outputs as responses to the utterances, wherein the plurality of dialog modules include a first dialog module coupled to provide an output to a second dialog module;

a task flow generation module functionally coupled to the plurality of dialog modules and that receives a task flow defining a set of tasks for human agent control over real-time collection of dialog data for the speaker, a starting task, and relationships among the tasks, and that generates a script that comprises a formal description of the task flow, the script of the task flow automatically generating a graphical user interface that includes templates for control of the dialog modules and real-time collection of dialog data for the speaker, the script generating a plurality of tags defining parameters of the tasks and one or more elements of the automatically generated graphical user interface;

a controller circuit embodied within the processor, the controller circuit functionally coupled to the first dialog module, wherein the controller circuit detects an abnormal output of the first dialog module when the first dialog module is processing the utterances in an automatic mode and outputs a signal indicating the abnormal output; and an operator interface coupled to the plurality of dialog modules and the controller circuit, wherein the operator interface receives the signal and executes the task flow to automatically generate the graphical user interface, wherein the graphical user interface comprises a plurality of display panels including a first panel configured to allow the human agent to control the synthetic speech or text outputs, and a second panel configured to display at least a portion of the task flow, and wherein the templates for control of the dialog modules include a mode control for the human agent to control the first dialog module through the controller by correcting the abnormal output and transferring a corrected output to the second dialog module, wherein the corrected output is used in further processing the utterances.

2. The dialog system of claim 1, wherein the controls of the operator interface comprise a reply control for the human agent to generate and send a synthetic speech reply message to a caller in response to the abnormal output.

3. The dialog system of claim 1, wherein the controller detects the abnormal output using a confidence measure that includes a measure of posterior probability.

4. The dialog system of claim 3, wherein the script is written in a markup language conforming to Wizard-of-Oz (WOZ) methodology for collecting machine-directed speech data.

5. The dialog system of claim 4, wherein the formal description of the task flow is embodied in scripting code executed by the processor to generate the plurality of tags, wherein a script tag surrounds the scripting code and a trigger attribute of the script tag defines when the task flow is executed to automatically generate the graphical user interface, and wherein the trigger condition defined by the trigger attribute is related to the confidence measure, and further wherein the plurality of tags includes a start tag that specifies the task that automatically generates the graphical user interface, and a task tag that describes a task of the task flow that the human operator will control.

6. The dialog system of claim 5, wherein the templates for control include prompts for guiding the human operator through numerous tasks for correcting the abnormal output, and further wherein the graphical user interface includes a graphical depiction of relationships among tasks of the task flow.

7. The dialog system of claim 1, wherein the controller detects the abnormal output using a measure of repeats of the utterances or dialog patterns.

8. The dialog system of claim 1, wherein the controller is coupled to the plurality of dialog modules, wherein the controller detects an abnormal output of any of the plurality of dialog modules when the plurality of dialog modules are processing the utterances in an automatic mode and outputs a signal indicating the abnormal output, wherein the operator interface comprises a mode control for a human agent to control any of the plurality of dialog modules by correcting the abnormal output of any of the plurality of dialog modules and transferring a corrected output to a downstream dialog module that follows, in a processing path, the dialog module from which the abnormal output is detected, wherein the corrected output is used in further processing the utterances.

9. The dialog system of claim 1, wherein the plurality of dialog modules are selected from a group consisting of a dialog manager module, a language understanding module, a response generator module, a speech recognizer module, a text-to-speech module, a knowledge manager module, and an application manager module.

10. A system comprising:

a dialog module embodied in a processor that receives and processes utterances from a speaker and outputs data used to generate synthetic speech outputs as responses to the utterances;

a task flow generation module functionally coupled to the plurality of dialog modules and that receives a task flow defining a set of tasks for human agent control over real-time collection of dialog data for the speaker, a starting task, and relationships among the tasks, and that generates a script that comprises a formal description of the task flow, the script of the task flow automatically generating a graphical user interface that includes templates for control of the dialog modules and real-time collection of dialog data for the speaker, the script generating a plurality of tags defining parameters of the tasks and one or more elements of the automatically generated graphical user interface;

a controller circuit embodied within the processor, the controller circuit functionally coupled to the dialog module, wherein the controller detects an abnormal output of the dialog module when the dialog module is processing in an automatic mode; and a graphical user interface that is automatically generated in the automatic mode when the processor executes the script of the task flow, wherein the graphical user interface comprises a plurality of display panels including a first panel configured to allow the human agent to control the synthetic speech or text outputs, and a second panel configured to display at least a portion of the task flow, and wherein the templates for control of the dialog module include a mode control for the human agent to control the dialog module by correcting the abnormal output and transferring a corrected output to a downstream dialog module that follows, in a processing path, the dialog module, wherein the corrected output is used in further processing the utterances.

11. The system of claim 10, comprising an interface coupled to the dialog module and the controller, wherein the interface includes an indicator that displays a signal indicating presence of the abnormal output, wherein the human agent controls the dialog module using the interface, and wherein the templates for control include prompts for guiding the human operator through numerous tasks for correcting the abnormal output, and further wherein the graphical user interface includes a graphical depiction of relationships among tasks of the task flow.

12. The system of claim 11, wherein the interface includes a reply control for the human agent to generate and send a synthetic speech reply message to a caller in response to the abnormal output.

13. The system of claim 10, wherein the controller detects the abnormal output using an attribute selected from a group consisting of a confidence measure, a posterior probability, and a number of repeats of the utterances, and further wherein the formal description of the task flow is embodied in scripting code executed by the processor, the attribute is a trigger attribute of that defines when the task flow is executed to automatically generate the graphical user interface.

14. The system of claim 10, wherein the dialog module is selected from a group consisting of a dialog manager module, a language understanding module, a response generator module, a speech recognizer module, a text-to-speech module, a knowledge manager module, and an application manager module.

15. A computer-implemented method comprising:

receiving and processing, in a processor-based dialog system, utterances from a speaker and generating synthetic speech outputs as responses to the utterances using a plurality of dialog modules of the dialog system, the plurality of dialog modules including a first dialog module coupled to provide an output to a second dialog module;

receiving a task flow defining a set of tasks for a human agent control over real-time collection of dialog data for the speaker, a starting task, and relationships among the tasks;

generating a script that comprises a formal description of the task flow to automatically generate a graphical user interface, the script generating a plurality of tags defining parameters of the tasks and one or more elements of the automatically generated graphical user interface, the graphical user interface including templates for control of the dialog modules and real-time collection of dialog data for the speaker, the task flow comprising prompts for helping the human agent guide the speaker through a dialog using the dialog system;

automatically detecting, using a processor of the processor-based dialog system, an abnormal output of the first dialog module when the first dialog module is processing the utterances in an automatic mode and outputting a signal indicating the abnormal output;

automatically generating the graphical user interface for the human agent upon detection of the signal, wherein the graphical user interface is generated by execution of a script defining a formal description of the task flow, wherein the graphical user interface comprises a plurality of display panels including a first panel configured to allow the human agent to control the synthetic speech or text outputs, and a second panel configured to display at least a portion of the task flow;

allowing the human agent to control the first dialog module through the graphical user interface by correcting the abnormal output; and transferring a corrected output to the second dialog module, wherein the corrected output is used in further processing the utterances.

16. The method of claim 15, comprising generating and sending a synthetic speech reply message to a caller in response to the abnormal output.

17. The method of claim 15, wherein the automatically detecting comprises detecting the abnormal output using a confidence measure, the method further comprising defining a trigger attribute based on the confidence measure that determines when the task flow is executed to automatically generate the graphical user interface.

18. The method of claim 15, wherein the automatically detecting comprises detecting the abnormal output using a measure of repeats of the utterances.

19. The method of claim 15, wherein the automatically detecting comprises detecting the abnormal output of the plurality of dialog modules.

20. The method of claim 15, wherein the plurality of dialog modules are selected from a group consisting of a dialog manager module, a language understanding module, a response generator module, a speech recognizer module, a text-to-speech module, a knowledge manager module, and an application manager module.

21. A non-transitory computer-readable medium including executable instructions which when executed in a processing system control components of a dialog system by:

receiving and processing utterances into a processor-based dialog system from a speaker and generating synthetic speech outputs as responses to the utterances using a plurality of dialog modules of a dialog system, the plurality of dialog modules including a first dialog module coupled to provide an output to a second dialog module;

receiving a task flow defining a set of tasks for a human agent control over real-time collection of dialog data for the speaker, a starting task, and relationships among the tasks;

generating a script that comprises a formal description of the task flow to automatically generate a graphical user interface, the script generating a plurality of tags defining parameters of the tasks and one or more elements of the automatically generated graphical user interface, the graphical user interface including templates for control of the dialog modules and real-time collection of dialog data for the speaker, the task flow comprising prompts for helping the human agent guide the speaker through a dialog using the dialog system;

automatically detecting an abnormal output of the first dialog module when the first dialog module is processing the utterances in an automatic mode and outputting a signal indicating the abnormal output;

automatically generating the graphical user interface for the human agent upon detection of the signal, wherein the graphical user interface is generated by execution of a script defining a formal description of the task flow, wherein the graphical user interface comprises a plurality of display panels including a first panel configured to allow the human agent to control the synthetic speech or text outputs, and a second panel configured to display at least a portion of the task flow;

allowing the human agent to control the first dialog module through the graphical user interface by correcting the abnormal output; and transferring a corrected output to the second dialog module, wherein the corrected output is used in further processing the utterances.

* * * * *